United States Patent
Hince et al.

[11] Patent Number: 6,020,185
[45] Date of Patent: Feb. 1, 2000

[54] METHOD AND COMPOSITION FOR THE ANAEROBIC BIODEGRADATION OF TOXIC COMPOUNDS

[75] Inventors: Eric Christian Hince; Robert L. Zimmer; Timothy H. Anderson, all of Harriman, N.Y.

[73] Assignee: Geovation Consultants, Inc., Florida, N.Y.

[21] Appl. No.: 08/862,782

[22] Filed: May 23, 1997

[51] Int. Cl.$^7$ ........................................... B09B 3/00
[52] U.S. Cl. ............. 435/262; 435/262.5; 423/DIG. 17; 588/249
[58] Field of Search ................. 435/262, 262.5; 423/DIG. 17; 588/249

[56] References Cited

U.S. PATENT DOCUMENTS

| | | | |
|---|---|---|---|
| 5,178,491 | 1/1993 | Graves et al. | 405/128 |
| 5,227,069 | 7/1993 | Van Dort et al. | |
| 5,265,674 | 11/1993 | Fredrickson et al. | 166/246 |
| 5,340,376 | 8/1994 | Cunningham | 71/6 |
| 5,342,769 | 8/1994 | Hunter et al. | 435/166 |
| 5,363,913 | 11/1994 | Jenneman et al. | 166/246 |
| 5,369,031 | 11/1994 | Middleditch et al. | 435/284 |
| 5,384,048 | 1/1995 | Hazen et al. | 210/605 |
| 5,387,271 | 2/1995 | Crawford et al. | 71/9 |
| 5,398,756 | 3/1995 | Brodsky et al. | 166/248 |
| 5,413,713 | 5/1995 | Day et al. | 210/617 |
| 5,476,992 | 12/1995 | Ho et al. | 588/204 |
| 5,482,630 | 1/1996 | Lee et al. | 210/605 |
| 5,556,536 | 9/1996 | Turk | 210/150 |
| 5,560,737 | 10/1996 | Schuring et al. | 405/128 |

Primary Examiner—David A. Redding
Attorney, Agent, or Firm—Ezra Sutton

[57] ABSTRACT

Liquid chemical compositions are disclosed for anaerobic biodegradation, detoxification, and transformation of toxic organic and inorganic compounds in a contaminated geologic media under reducing conditions, including, but not limited to, denitrifying, manganese-reducing, iron-reducing and sulfate-reducing conditions. One such liquid chemical composition includes sodium nitrate in the range of one-fifth (0.2) to four (4) pounds per gallon of the chemical composition; sodium hexametaphosphate or other biologically hydrolyzable ring or linear polyphosphate in the range of one twentieth (0.05) to five (5) pounds per gallon of the chemical composition; a surfactant in the range of 0.01% to 10% by volume of the chemical composition; and a diluent in the form of water. A method is disclosed for anaerobic biodegradation, detoxification, and transformation of toxic organic and inorganic compounds in a contaminated geologic media.

16 Claims, 12 Drawing Sheets

10

Denitrification

Manganese(IV) Reduction

Iron(III) Reduction

Sulfate Reduction

10

Denitrification

Manganese(IV) Reduction

Iron(III) Reduction

Sulfate Reduction

METHOD AND COMPOSITION FOR THE ANAEROBIC BIODEGRADATION OF TOXIC COMPOUNDS

FIELD OF THE INVENTION

The present invention relates to a new and improved anaerobic bioremediation system and method thereof for anaerobic biodegradation, detoxification and transformation of toxic organic and inorganic compounds in contaminated geologic formations to harmless and safe organic and inorganic materials within the geologic media. More particularly, the bioremediation system includes a chemical composition and apparatus for implementing the conversion of contaminated organic and inorganic materials to clean, safe, and harmless materials via naturally occurring anaerobic bioremediation within the geologic media.

BACKGROUND OF THE INVENTION

Aerobic and anaerobic bioremediation of contaminated soils, ground water sites, lakes, ponds, aquifers, wells, shore fronts, oceans and the like have proven effective in remediating toxic organic and inorganic compounds such as fuel oil, gasoline, PCBs, DDT, and other pesticides, and the like. Bioremediation projects that have been successfully implemented are in areas that include underground storage tank spills and leakages; hazardous solid wastes; ground spills; and contamination of ground water (wells), geological aquifers and the like. Aerobic and anaerobic bioremediation have proven to be more cost effective and timely than conventional engineering technologies, and have the further advantage in that they do not produce wastes which enter the surrounding air, water and soils. Anaerobic bioremediation has been shown to be the most effective and least expensive method of remediation of toxic materials. Other remediation technologies such as standard physical soil and groundwater remediation ie. excavation and disposal or pump and treat systems and soil-vapor extraction (SVE) remediation which have all been shown to be moderately high in capital costs; require long-term operation and maintenance including labor, materials and power consumption; time parameters that are in months to years; and remediation effectiveness results being moderately low in the cleaning-up of the contaminated soils and ground water. These remediation techniques are also limited by considerations of depth of soil to be removed; obstructions in the geologic formations; safety conditions at the site; and environmental law statutes with regard to Federal, State and local regulatory agencies for a site remediation project that produces wastes that effect air, water and soil conditions. These aforementioned remediation technologies generally are less feasible, and significantly more expensive and sometimes prohibitive in terms of logistics and/or overall costs.

Problems associated with anaerobic bioremediation have included the difficulty of achieving significant increases in the naturally occurring indigenous microorganisms at the contaminated site using appropriate chemical compositions of nutrients that would successfully have the indigenous anaerobic bacteria metabolize the organic and inorganic contaminants. The inability to maximize the rate of metabolism of toxic contaminants by anaerobic microorganisms can be due to inadequate or incorrect electron acceptors, nutrient forms of nitrogen and phosphorus, trace-mineral micronutrients, chelating agents, non-toxic surfactants, lack of carbon co-substrates, and inerting agents. There is also a physical inability to deliver, distribute and disperse the nutrients readily, rapidly and over a wide distribution area within the contaminated geologic media for effective biodegradation of the contaminated substances into non-toxic end-products. Also, there is a difficulty of working with anaerobic microorganisms and processes because the biochemical pathways describing the anaerobic degradation of organic and inorganic compounds have been difficult to characterize, and to a large degree, are yet to be fully understood. Thus, it can be seen that anaerobic bioremediation of contaminated geologic media such as ground water (wells), sludge, soil and the like is not an easy or simple technological problem.

There remains a need for an improved method and apparatus for the anaerobic bioremediation of organic and inorganic toxic compounds within a contaminated geologic media to form non-toxic end products without further formation of waste by-products that effect air, water and soil qualities at the geologic site. In addition, there is a need that the bioremediation be accomplished by having an in-situ treatment of the contaminated geologic media such that the organic and inorganic contaminants are metabolized or transformed by naturally occurring indigenous, denitrifying and/or manganese-, iron- and sulfate-reducing anaerobic microorganisms using the aforementioned electron acceptors, in combination with nutrients, surfactants, chelating agents, a diluent, and an inert gas to convert the contaminants within the contaminated geologic media into non-toxic end products. These naturally occurring indigenous microorganisms which operate using one or more respiration pathways are hereafter called "multiple respiration pathway" (MRP) microorganisms.

DESCRIPTION OF THE PRIOR ART

Methods, apparatus and chemical compositions having nutrients for bioremediation using anaerobic microorganisms have been disclosed in the prior art. For example, U.S. Pat. No. 5,178,491 to Graves et al discloses a vapor-phase nutrient delivery system for in-situ bioremediation of soil. The nutrients are delivered in the vapor phase to the affected areas of the contaminated soil for utilization by microorganisms to promote the metabolism of organic contaminants by the microorganisms. The delivery system includes a series of pumps, nutrient tanks, conduits, and wells for implementing the bioremediation process. This prior art patent does not disclose the apparatus, process or chemical compositions for the bioremediation of contaminated geologic media as in the present invention.

U.S. Pat. No. 5,265,674 to Fredrickson et al discloses an enhancement method of in-situ remediation of aquifers. This method of bioremediation is adapted to deliver microorganisms, enzymes, nutrients and electron donors to subsurface zones contaminated by nitrates in order to stimulate or enhance denitrification. The remediation system includes nutrient tanks, pumps, conduit/piping, an injection well and reclamation tanks. This prior art patent does not disclose the apparatus, process or chemical compositions for the bioremediation of contaminated geologic media as in the present invention.

U.S. Pat. No. 5,342,769 to Hunter et al discloses a method for bioremediation of liquid or slurry hazardous waste streams for the removal of halogenated hydrocarbons by using naturally occurring anaerobic microorganisms having methanogenic characteristics. The remediation method includes a series of reactors, pumps, vacuum pumps, and conduits. This prior art patent does not disclose the apparatus, process or chemical compositions for the bioremediation of contaminated geologic media as in the present invention.

U.S. Pat. No. 5,384,048 to Hazen et al discloses an apparatus and method for in-situ bioremediation of contaminated ground water and/or contaminated subsurface soil by chlorinated hydrocarbons. A nutrient fluid is used to stimulate the growth and reproduction of indigenous aerobic microorganisms that are capable of degrading the contaminants. The apparatus used for the bioremediation process includes injection wells, pumps, conduits, and monitoring/sensor components. This prior art patent does not disclose the apparatus, process or chemical compositions for the bioremediation of contaminated geologic media as in the present invention.

U.S. Pat. No. 5,398,756 to Brodsky et al discloses a process for the in-situ bioremediation of contaminated soil. The process includes the forming of at least one liquid permeable region within the contaminated soil region, introducing microorganisms, nutrients and the like for degrading contaminants in the contaminated soil region, and transmitting direct electric current through the contaminated soil region for degrading the contaminants by electrochemical means. This prior art patent does not disclose the apparatus, process or chemical compositions for the bioremediation of contaminated geologic media as in the present invention.

U.S. Pat. Nos. 5,482,630 and 5,556,536 to Lee et al and Turk disclose a controlled denitrification process and system using a bacterial bed. This bioprocess system is used for the reduction of nitrate to nitrogen in a fluid medium, such that anaerobic bacteria fed by a carbon source are used for the nitrate reduction. A column of suspended beads are used as the anaerobic bacterial bed for denitrification. This prior art patent does not disclose the apparatus, process or chemical compositions for the bioremediation of contaminated geologic media as in the present invention.

U.S. Pat. No. 5,560,737 to Schuring et al discloses a method and apparatus for pneumatic fracturing and multi-component injection enhancement of in-situ bioremediation in treating subsurface soil contaminated with organic compounds. This bioremediation method and apparatus provides for reducing or eliminating non-naturally occurring, subsurface, liquid contaminants within a geologic formation, which involves the steps of pneumatically fracturing the soil formation to produce a fracture network. A pressurized gas stream is used having nutrients, oxygen, electron acceptors, pH buffers, and possible bacterial augmentation to add a different culture of microorganisms to the soil formation when used in fracturing the soil formation. This provides the proper growth of the bioremediation microorganisms within the fracture network in which to degrade the contaminated materials within the water or soil formations. This prior art patent does not disclose the apparatus, process or chemical compositions for the bioremediation of contaminated geologic media as in the present invention.

None of the prior art patents teach or disclose the apparatus, process or chemical compositions for the bioremediation of contaminated geologic media as in the present invention. Also, none of the prior art patents teach or disclose the process or system of the current invention for the in-situ treatment of contaminated geologic media by using multiple-respiration pathway (MRP) anaerobic microorganisms such as denitrifying, manganese-, iron- and sulfate-reducing anaerobic microorganisms.

Accordingly, it is an object of the present invention to provide an anaerobic bioremediation system for the anaerobic biodegradation, detoxification and transformation of toxic organic and inorganic contaminants in contaminated geologic media into non-toxic compounds without further formation of regulated wastes or other undesirable by-products that effect the air, water and soil at environmental-contamination sites.

Another object of the present invention is to provide an anaerobic bioremediation system for in-situ treatment of geologic media containing organic and inorganic contaminants that are metabolizable or transformable by indigenous anaerobic bacteria capable of utilizing one or more multiple respiration pathways (MRP) including denitrification, manganese-reduction, iron-reduction and sulfate-reduction within the contaminated geologic media at a site.

Another object of the present invention is to provide an anaerobic bioremediation system having apparatus which enables the delivery of nutrients and electron acceptors having an inert carrier gas to the indigenous MRP anaerobic microorganisms in order to promote conditions favorable to the growth of these indigenous microorganisms such that the metabolism or transformation of the contaminants by these microorganisms can easily take place, without the use of implanted microorganisms at the contaminated site.

Another object of the present invention is to provide an anaerobic bioremediation system having apparatus which enables the nutrients and electron acceptors and an inert carrier gas to be more readily and rapidly dispersed in the contaminated geologic media and made more available to a large area within the contaminated geologic media.

Another object of the present invention is to provide an anaerobic bioremediation system having the nutrients, electron acceptors, chelating agents, surfactants and diluent with an inert carrier gas being in a chemical composition form that is readily utilizable and metabolizable by the indigenous MRP anaerobic microorganisms.

Another object of the present invention is to provide an anaerobic bioremediation system that has the capacity to supply macro-nutrients, micro-nutrients, electron acceptors, surfactants, and chelating agents, as well as to modify the pH, redox potential and oxygen availability in the subsurface geologic media.

Another object of the present invention is to provide an anaerobic bioremediation system that has the capacity to supply organically usable phosphate to phosphate-limited environments whereby sodium hexametaphosphate or other forms of hydrolyzable ringed or linear polyphosphates are used as the primary source of phosphate as such compounds are much less prone to in-situ precipitation than other forms of phosphate which enables a major improvement for the stimulation and growth of indigenous MRP microorganisms in the contaminated geologic formation.

Another object of the present invention is to provide an anaerobic bioremediation system that has the capacity to supply nitrate as both an electron acceptor and the main source of assimilated (i.e., nutrient) nitrogen, taken together with other unique aspects of the chemical compositions of the present invention, which enables a major improvement for the stimulation and growth of indigenous MRP microorganisms in the contaminated geologic media.

Another object of the present invention is to provide an anaerobic bioremediation system having apparatus that is simple to construct and use and which enables efficient delivery and monitoring of the nutrients and electron acceptors for the optimum growth rate and kinetics of various indigenous, denitrifying and other MRP anaerobic microorganisms in order to maximize the rate of degradation and transformation of the contaminants into non-toxic compounds by these indigenous MRP microorganisms.

Another object of the present invention is to provide an anaerobic bioremediation system having a process that is inexpensive and easy to operate, especially in the field on a large scale basis.

Another object of the present invention is to provide an anaerobic bioremediation system having a process that can be performed rapidly and safely in the field and result in the site meeting environmental clean-up standards set by various governmental agencies more rapidly and at a lower cost than can be accomplished with other methods.

A further object of the present invention is to provide an improved anaerobic bioremediation system that can be easily produced in an automated and economical manner and is readily affordable by various responsible parties, consultants, contractors, engineers, governmental agencies and corporate users.

SUMMARY OF THE INVENTION

In accordance with the present invention there are provided liquid chemical compositions for anaerobic biodegradation, detoxification, and transformation of toxic organic and inorganic compounds in a contaminated geologic media. One such liquid chemical composition includes sodium nitrate in the range of one-fifth (0.2) to four (4) pounds per gallon of the chemical composition; sodium hexametaphosphate or other biologically hydrolyzable ring or linear polyphosphate in the range of one twentieth (0.05) to five (5) pounds per gallon of the chemical composition; a surfactant in the range of 0.01% to 10% by volume of the chemical composition; and a diluent in the form of water.

The present invention further includes a bioremediation apparatus for anaerobic biodegradation, detoxification, and transformation of toxic organic and inorganic compounds in a contaminated geologic media. The bioremediation apparatus includes a first set of one or more storage tanks containing a chemical composition for anaerobic biodegradation of toxic compounds in contaminated geologic media; a plurality of quick disconnect valve couplings connected to the first set of storage tanks; at least one logic controller having a logic controller programmer component for opening and closing an automatic ball valve connected to the first set of storage tanks to supply the chemical composition to the contaminated geologic media; and a screened well connected to the first set of storage tanks for supplying the chemical composition to the contaminated geologic media.

The present invention also includes a method for anaerobic biodegradation, detoxification, and transformation of toxic organic and inorganic compounds in contaminated geologic media. The method includes pressurizing one or more storage tanks containing a chemical composition and an inert carrier gas; connecting a plurality of quick disconnect valve couplings to one or more pressurized storage tanks; connecting a well to an automatic ball valve for supplying the chemical composition and the inert carrier gas through the well to the contaminated geologic media; and opening and closing of the automatic ball valve to dispense the chemical composition and the inert carrier gas under pressure through the well to the contaminated geologic media.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENTS OVERVIEW OF THE INVENTION

Figure 1:
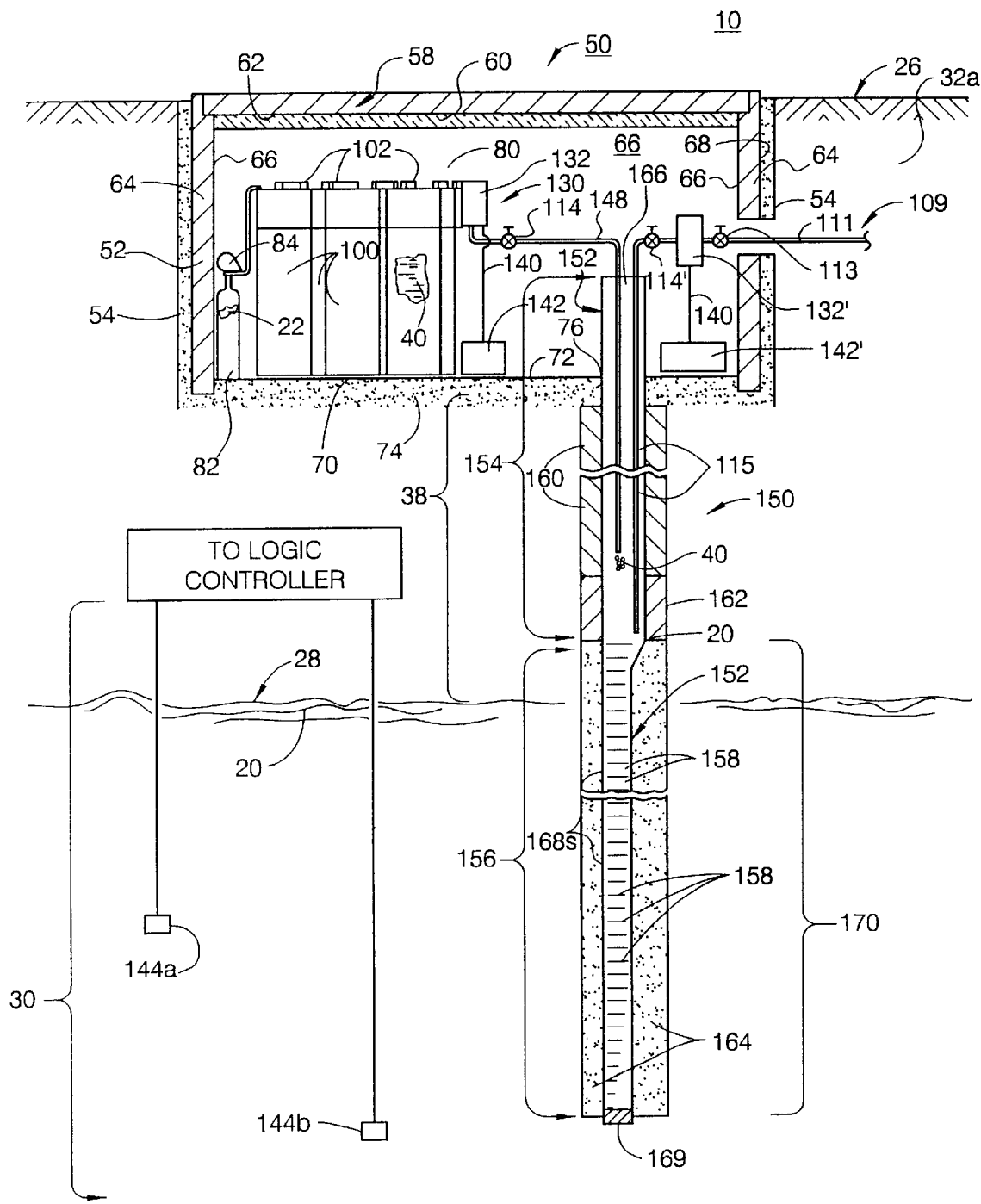
FIG. 1 is a side elevational view of the anaerobic bioremediation system of the preferred embodiment of the present invention showing the bioremediation processing apparatus and its major component assemblies therein and in operational use.

The anaerobic bioremediation system, methods, chemical compositions and apparatus of this invention provide the means for the anaerobic biodegradation, detoxification and transformation of toxic organic and inorganic compounds in contaminated geologic media to harmless and safe organic and inorganic materials within the geologic media. In-situ bioremediation has recently emerged as the general category of site remediation technologies which provides for the most timely and effective remediation of contaminated soil and ground water from petroleum hydrocarbon spills, releases of halogenated hydrocarbons, solvents and pesticides, inorganic chemical dumping, and the like. Furthermore, field demonstrations of bioremediation technologies have typically outperformed laboratory studies, even though it has often been assumed by experts in the field that ideal conditions were established in the laboratory. The success of bioremediation field trials, including those of the present invention, is thought to be attributable to the greater diversity of bacterial populations and their enzymatic processes that are present in the natural hydrogeologic settings versus those that can be established in laboratory microcosms.

In-situ bioremediation provides for the potential of a swift reduction of contaminant levels, often in periods as short as weeks to months, as shown in examples of the actual use of the present invention on contaminated geologic formations as provided below. The present invention uses naturally-occurring bacteria that are indigenous to the geologic formation being remediated for the degradation of hydrocarbons, solvents, pesticides, hazardous wastes and the like. The theoretical basis and effectiveness of using indigenous MRP anaerobic microorganisms capable of denitrification, manganese-reduction, iron-reduction and sulfate-reduction is demonstrated in the bioremediation process diagram (FIG. 10) which describes the theoretical operation of the bioremediation system 10 of the present invention. The present invention provides a means of stimulating such MRP anaerobic microorganisms so as to achieve rapid and effective degradation and remediation of aromatic hydrocarbons as well as halogenated hydrocarbons, pesticides, hazardous wastes and other contaminants as demonstrated in the forthcoming examples of projects conducted at actual contaminated geologic sites.

The principle of using anaerobic microorganisms such as denitrifying bacteria and other MRP anaerobic bacteria in the present invention is dependent upon the natural sequence of electron-acceptor utilization by bacteria within geologic media as well as the natural occurrence and/or solubility of these electron acceptors in water. Bacteria utilize electron acceptors in the order of their decreasing energy yield (Gibbs Free Energy $[_\Delta G]$ in KJ/mole $CH_2O$). In theory, as the availability of a higher-energy electron acceptor wanes (e.g., $O_2$), conditions become favorable for microbial respiration with lower-energy electron acceptors (e.g., $NO_3$, $Mn(IV)$, $Fe(III)$, and $SO_4$). The natural sequence of microbial utilization of electron acceptors in the environment is summarized in Table 1 below:

TABLE 1

Energy Yield and Solubility of Microbial Electron Acceptors

| Electron Acceptor | $[_\Delta G]$ in KJ/mole $CH_2Oa$ | Max. Solubility $(mg/l)^b$ |
|---|---|---|
| $O_2$ | −475 | $10^c$ |
| $NO_3$ | −448 | $637,000^d$ |
| $MnO_2$ | −349 | Insoluble mineral |
| $Fe(OH)_3$ | −114 | Insoluble mineral |
| $SO_4$ | −77 | $113,000^e$ |
| $CO_2$ | −58 | $2,000^f$ |

<sup>a</sup>Based on unpublished data from Robert C. Aller (1987), Marine Sciences Research Center, The State University of New York at Stony Brook.
<sup>b</sup>Based otherwise specified, solubility is that in water under typical "water table" conditions: 15° C., 1 atm. pressure.
<sup>c</sup>American Public Health Association et al. (1992).
<sup>d</sup>Solubility of $NO_3$ as a solution of sodium nitrate ($NaNO_3$).
<sup>e</sup>Solubility of $SO_4$ as a solution of ferrous sulfate heptahydrate at 0° C. (Solubility is 513,323 at 50° C.).
<sup>f</sup>Solubility of $CO_2$ (as $CO_2$) at 15° C. estimated from Perry's Chemical Engineers' Handbook, Sixth Edition, 1984.
Note:
The natural sequence of microbial electron-acceptor utilization described in Table 1 is based on the original research of Froelich et al. (1979).

Most bioremediation processes described in the prior art and in the literature have involved the addition of oxygen in attempts to facilitate the aerobic degradation of various organic contaminants. However, it is very difficult to maintain sufficient concentrations of oxygen in-situ to support aerobic biodegradation, largely due to the low solubility of oxygen in ground water ($\leq 10$ mg/l), as well as the multitude of both biological and chemical "sinks" of oxygen in the subsurface. In contaminated ground waters, redox conditions are typically strongly reducing and dissolved oxygen concentrations are typically insufficient (i.e., $\leq 1$ mg/l) to support strictly-aerobic respiration. Therefore, given the low solubility and reactivity of oxygen, it is typically impractical to maintain non-limiting conditions of oxygen-availability in the subsurface.

As shown in Table 1 above, nitrate and sulfate salts are much more soluble in water than is oxygen. Nitrate and sulfate are also more "conservative" than oxygen in terms of their geochemistry, i.e., these species are less reactive and more mobile. Therefore, diffusive processes can be used to deliver non-limiting concentrations of nitrate and sulfate to the interior of ground-water contaminant plumes in relatively short periods of time because of the significant in-situ concentration gradients that can be established by the present invention.

Although aeration of subsurface sediments (e.g., air sparging) has been used with some success, a documented problem with the aeration and/or oxygenation of contaminated ground waters containing elevated concentrations of iron and manganese (i.e., $\geq 25$ mg/l) is that such processes lead to the oxidation and precipitation of these species in-situ. Accordingly, aeration, oxygen-injection, peroxide injection and other similar aerobic bioremediation processes tend to reduce the effective porosity and hydraulic conductivity of the geologic media in-situ which ultimately slows the rate of site remediation. Iron oxidation and fouling problems have often been encountered in pump and treat systems as evidenced by air-strippers which have become fouled with iron. The use of the present invention however, avoids this problem altogether by focusing on the enhancement of the naturally anaerobic and reducing conditions present in contaminated geologic media.

As shown in Table 1 above, nitrate provides denitrifying bacteria with a significant Gibbs-Free-Energy ($\Delta G=-448$ KJ/mole $CH_2O$), which is within approximately 5% of that of oxygen. In addition, denitrification is more efficient (if not more rapid) than aerobic processes, as only 1 mole of nitrate versus 1.25 moles of oxygen is consumed in the degradation of one mole of contaminant. Reactions which describe aerobic, denitrification, manganese-reduction, iron-reduction, and sulfate-reduction mediated biodegradation of an idealized hydrocarbon contaminant (—CH—) are provided in Table 2 below:

TABLE 2

| Bioremediation Respiration Pathway | Generalized Stoichiometric Equation |
|---|---|
| (1) Aerobic | $12\text{-CH—} + 15O_2 \rightarrow 12CO_2 + 6H_2O$ |
| (2) Denitrification | $\text{—CH—} + NO_3^- + H^+ \rightarrow CO_2 + \frac{1}{2}N_2 + H_2O$ |
| (3) Manganese Reduction | $\text{—CH—} + \frac{1}{2}Mn(IV) + 3H_2O \rightarrow \frac{1}{2}Mn(II) + HCO_3^- + 6H+$ |
| (4) Iron Reduction | $\text{—CH—} + Fe(III) + 3H_2O \rightarrow Fe(II) + HCO_3^- + 6H^+$ |
| (5) Sulfate Reduction | $\text{—CH—} + SO_4^{-2} + 5H^+ \rightarrow CO_2 + H_2S + 2H_2O$ |

As shown in Table 2 above, the ultimate end-products of denitrification are carbon dioxide, water and elemental-nitrogen gas. Consequently, the present invention facilitates the use of denitrification as a naturally safe and practical means of bioremediation as shown in the bioremediation process 10 of the present invention. When combined with the stimulation of manganese-reducing, iron-reducing and sulfate-reducing bacteria as enabled by this invention, a significant and consistently demonstrable improvement in site remediation is provided.

Overview of the Bioremediation Chemical Compositions

With regard to the present invention, naturally occurring (i.e., indigenous) microorganisms that are capable of using one or more multiple respiration pathways are hereafter defined as multiple respiration pathway (MRP) microorganisms. The use of the present invention provides a means for the stimulation and maintenance of either denitrifying conditions alone or, alternatively, a means of alternating and/or cycling through a natural range of oxidation-reduction potentials and the related sequence of anaerobic microbial respiration pathways including denitrification, manganese-reduction, iron-reduction and sulfate-reduction. The bioremediation processes of the present invention are represented by the general stoichiometric equations shown in FIG. 10 of the drawings and in Table 2 above. The present invention enables these processes to occur either independently, in succession or in different zones within the contaminated geologic media.

The bioremediation nutrient fluids of the present invention are chemical compositions for use in the anaerobic bioremediation system 10 of the present invention, and are essential and extremely important factors for stimulating the growth and reproduction of the indigenous MRP anaerobic microorganisms 12 which are capable of degrading the organic contaminants 14 into safe and harmless end products such as carbon-dioxide gas ($CO_2$) 16, nitrogen gas ($N_2$) 18 and water ($H_2O$) 20 and various salts and organic acids depending on both the contaminant of concern and the anaerobic respiration process involved. The chemical compositions of the present invention include electron-acceptor compounds for stimulating microbial respiration, macro-nutrients for providing substrates for biosynthesis and growth, a diluent, chelating agents, a biodegradable surfactant agent for increasing the biological availability of organic contaminants and controlling the surface activity of the nutrient chemical compositions into and throughout the contaminated geologic media, and an inert carrier gas 22 for providing anaerobic conditions (i.e., no oxygen) for maximizing the growth of the MRP anaerobic bacteria 12 used within the bioremediation system 10, as well as to maintain either the gravitational or passive flow of the inert carrier gas 22 into the well or the addition of these materials under pressure. Electron donors are typically excluded from the chemical compositions but can be provided as either co-substrates or primary substrates in the chemical compositions of the present invention to help the MRP microorganisms either co-metabolize organic contaminants or biotransform inorganic contaminants, respectively. Similarly, micronutrients are typically excluded from the chemical compositions as the naturally-occurring trace metal micronutrients found in the geologic media at most contaminated sites typically provide an abundant supply of micronutrients; nonetheless, the present invention provides for a means of delivering micronutrients and/or chelating agents (to enhance micronutrient availability and transfer) to the contaminated geologic media.

Chemical Composition 40

The present invention includes a first chemical composition 40 for maximizing and facilitating contaminant degradation by indigenous MRP anaerobic microorganisms 12 within the contaminated geologic media. The preferred embodiment of the chemical nutrient fluid composition 40 includes a primary compound acting as both an electron acceptor and nutrient being sodium nitrate in the range of 0.2 to four (4) pounds per gallon of the chemical composition (2% to 32% by weight of the diluent), and a second nutrient compound being a biologically usable phosphate in the form of sodium hexametaphosphate or other biologically hydrolyzable ring or linear polyphosphate in the range of one twentieth (0.05) to five (5) pounds per gallon of the chemical composition (0.1% to 11% by weight of the diluent). The molar ratios of nitrate ($NO_3^-$) to phosphorus (P) are preferably in the range of 2:1 to 50:1, although site specific conditions may require deviations from this range.

The chemical composition 40 further includes biodegradable, non-toxic, surfactant agents such as Biosolve™ and equivalents thereof in the range of 0.01% to 10% by volume.

The chemical nutrient fluid composition 40 may further include chelating agents including citric acid, sodium citrate, nitrilotriacetic acid (NTA), ethylenediaminetetraacetic acid (EDTA), and equivalents thereof; in the range of 0.05 to 3 pounds per gallon of the chemical composition (0.1% to 6% by weight of the diluent).

These compounds are combined in the proper order with a suitable diluent, such as water.

The carrier gas 22 used in conjunction with the chemical composition 40 includes inert gases such as argon, neon, krypton, or xenon.

Chemical Composition 41

The present invention further includes a first alternate embodiment 41 for maximizing and facilitating contaminant degradation by indigenous MRP anaerobic microorganisms 12 within the contaminated geologic media. Chemical nutrient composition 41 substitutes all or some of the sodium nitrate characterized in chemical composition 40 with a primary compound acting as both electron acceptor and nutrient being dissolved nitrous oxide ($N_2O$) in the range of one one hundredth (0.01) to one fiftieth (0.02) pounds per gallon of the chemical composition (1% to 2% by weight of the diluent), and a second nutrient compound being a biologically usable phosphate in the form of sodium hexametaphosphate or other biologically hydrolyzable ring or linear polyphosphate in the range of one two hundredth (0.005) to five (5) pounds per gallon of the chemical composition (0.01% to 11% by weight of the diluent). The molar ratios of the combined nitrous oxide and nitrate nitrogen (N) to phosphorus (P) are preferably in the range of 0.5:1 to 50:1, although site specific conditions may require deviations from this range.

The chemical composition 41 further includes biodegradable, non-toxic, surfactant agents such as Biosolve™ and equivalents thereof in the range of 0.01% to 10% by volume.

The chemical nutrient fluid composition 41 may further include chelating agents including citric acid, sodium citrate, nitrilotriacetic acid (NTA), ethylenediaminetetraacetic acid (EDTA), and equivalents thereof; in the range of 0.05 to 3 pounds per gallon of the chemical composition 41 (0.1% to 6% by weight of the diluent).

These constituents are combined in the proper order with a suitable diluent, such as water.

The carrier gas 22 used in conjunction with the chemical composition 41 includes inert gases such as argon, neon, krypton, or xenon. In addition, some or all of the inert gas may be replaced with gaseous phase electron acceptors such as nitrous oxide or equivalent. Additionally, the gaseous phase electron acceptors such as nitrous oxide or equivalent chemicals may be used for direct infiltration into the contaminated geologic media to facilitate bioremediation of said media.

Chemical Composition 42

The present invention also includes a second alternate embodiment 42 for maximizing and facilitating contaminant degradation by indigenous sulfate-reducing and related MRP anaerobic microorganisms 12 within the contaminated geologic media. Chemical nutrient composition 42 includes a primary compound acting as an electron acceptor being ferrous sulfate heptahydrate, sodium sulfate or other soluble salts of sulfate in the range of one-half (0.5) to four (4) pounds per gallon of the chemical composition (approximately 1% to 25% by weight of the diluent), and a nutrient compound being a biologically usable phosphate in the form of sodium hexametaphosphate or other biologically hydrolyzable ring or linear polyphosphate in the range of one twentieth (0.05) to five (5) pounds per gallon of the chemical composition (0.1% to 11% by weight of the diluent). The molar ratios of the sulfate ($SO_4^-$) to phosphorus (P) are preferably in the range of 2:1 to 50:1, although site specific conditions may require deviations from this range.

The chemical composition 42 further includes biodegradable, non-toxic, surfactant agents such as Biosolve™ and equivalents thereof in the range of 0.01% to 10% by volume.

The chemical nutrient fluid composition 42 may further include chelating agents including citric acid, sodium citrate, nitrilotriacetic acid (NTA), ethylenediaminetetraacetic acid (EDTA), and equivalents thereof; in the range of 0.05 to 3 pounds per gallon of the chemical composition (0.1% to 6% by weight of the diluent).

These constituents are combined in the proper order with a suitable diluent, such as water.

The carrier gas 22 used in conjunction with the chemical composition 42 includes inert gases such as argon, neon, krypton, or xenon.

Chemical Composition 43

The present invention also includes a third alternate embodiment 43 for maximizing and facilitating contaminant degradation by indigenous anaerobic microorganisms using both iron reducing and nitrate reducing pathways for the oxidation of organic matter 12 within the contaminated geologic media. Chemical nutrient composition 43 includes a primary compound acting as a source of nutrient nitrogen and also acting as two forms of electron acceptor being ferric nitrate nonahydrate in the range of one (1) to ten (10) pounds per gallon of the chemical composition (2% to 19% by weight of the diluent), and a nutrient compound being a biologically usable phosphate in the form of sodium hexametaphosphate or other biologically hydrolyzable ring or linear polyphosphate in the range of one twentieth (0.05) to five (5) pounds per gallon of the chemical composition (0.1% to 11% by weight of the diluent). The molar ratios of the combined nitrate and ferric iron ($NO_3^-$ and Fe(III)) to phosphorus (P) are preferably in the range of 2:1 to 50:1, although site specific conditions may require deviations from this range.

The chemical composition 43 further includes biodegradable, non-toxic, surfactant agents such as Biosolve™ and equivalents thereof in the range of 0.01% to 10% by volume.

The chemical nutrient fluid composition 43 further includes chelating agents including citric acid, sodium citrate, nitrilotriacetic acid (NTA), ethylenediaminetetraacetic acid (EDTA), and equivalents thereof; in the range of 0.05 to 3 pounds per gallon of the chemical composition (0.1% to 6% by weight of the diluent).

These constituents are combined in the proper order with a suitable diluent, such as water.

The carrier gas 22 used in conjunction with the chemical composition 43 includes inert gases such as argon, neon, krypton, or xenon.

Chemical Composition 44

The present invention also includes a fourth alternate embodiment 44 for maximizing and facilitating contaminant degradation by indigenous anaerobic microorganisms 12 within the contaminated geologic media. Chemical nutrient composition 44 includes a primary compound acting as a source of both electron acceptor nitrogen and both nutrient nitrogen and micronutrient manganese being manganese nitrate, manganese nitrate tetrahydrate, or manganese nitrate hexahydrate in the range of one (1) to ten (10) pounds per gallon of the chemical composition (2% to 19% by weight of the diluent), and a nutrient compound being a biologically usable phosphate in the form of sodium hexametaphosphate or other biologically hydrolyzable ring or linear polyphosphate in the range of one twentieth (0.05) to five (5) pounds per gallon of the chemical composition (0.1% to 11% by weight of the diluent). The molar ratios of the combined nitrate and manganese to phosphorus (P) are preferably in the range of 2:1 to 50:1, although site specific conditions may require deviations from this range.

The chemical composition 44 further includes biodegradable, non-toxic, surfactant agents such as Biosolve™ and equivalents thereof in the range of 0.01% to 10% by volume.

The chemical nutrient fluid composition 44 may further include chelating agents including citric acid, sodium citrate, nitrilotriacetic acid (NTA), ethylenediaminetetraacetic acid (EDTA), and equivalents thereof; in the range of 0.05 to 3 pounds per gallon of the chemical composition (0.1% to 6% by weight of the diluent).

These constituents are combined in the proper order with a suitable diluent, such as water.

The carrier gas 22 used in conjunction with the chemical composition 44 includes inert gases such as argon, neon, krypton, or xenon.

Chemical Composition 45

The present invention also includes a fifth alternate embodiment 45 for maximizing and facilitating contaminant degradation by indigenous anaerobic microorganisms 12 within the contaminated geologic media. Chemical nutrient composition 45 contains no added compound acting as a source of electron acceptor. The primary ingredient of alternate embodiment 45 is a chelating agent which makes transition metals present in the geologic media more biologically available to MRP, with this chelating agent being citric acid, sodium citrate, nitrilotriacetic acid (NTA), ethylenediaminetetraacetic acid (EDTA), or equivalents thereof; in the range of 0.05 to 3 pounds per gallon of the chemical composition (0.1% to 6% by weight of the diluent), although site-specific conditions may require deviations from this range.

Chemical nutrient composition 45 also contains a nutrient compound being a biologically usable phosphate in the form of sodium hexametaphosphate or other biologically hydrolyzable ring or linear polyphosphate in the range of one twentieth (0.05) to five (5) pounds per gallon of the chemical composition (0.1% to 11% by weight of the diluent), although site specific conditions may require deviations from this range.

The chemical composition 45 further includes biodegradable, non-toxic, surfactant agents such as Biosolve™ and equivalents thereof in the range of 0.01% to 10% by volume.

The carrier gas 22 used in conjunction with the chemical composition 45 includes inert gases such as argon, neon, krypton, or xenon.

Solid Chemical Compositions 46

In addition, the present invention can also use solid chemical compounds such as glauconite, manganese greensand (a processed form of glauconite enriched in Mn(IV)), or pyrolusite, a mineral with the chemical formula of $Mn(IV)O_2$, where the Mn(IV) acts as an electron acceptor for manganese-reducing bacteria and/or MRP anaerobic bacteria. The glauconite, manganese greensand and/or pyrolusite can be used as a component of the well packing materials in combination with the filter sand for the well component assembly 150. The glauconite, manganese greensand and/or pyrolusite can also be used as a component in a remediation trench, slurry-wall, semi-permeable barrier or other subsurface remedial applications.

In addition, the present invention can also use other solid chemical compounds comprised in whole or in part with minerals containing Fe(III), such as Fe(III)OH. The Fe(III) acts as an electron acceptor for iron-reducing bacteria and/or other MRP anaerobic bacteria. The Fe(III) containing materials can be used as a component of the well packing materials in combination with the filter sand for the well component assemblies 150. The Fe(III) containing materials can also be used as a component in a remediation trench, slurry-wall, semi-permeable barrier or other subsurface remedial applications

Operation of the Compositions

Figure 10:
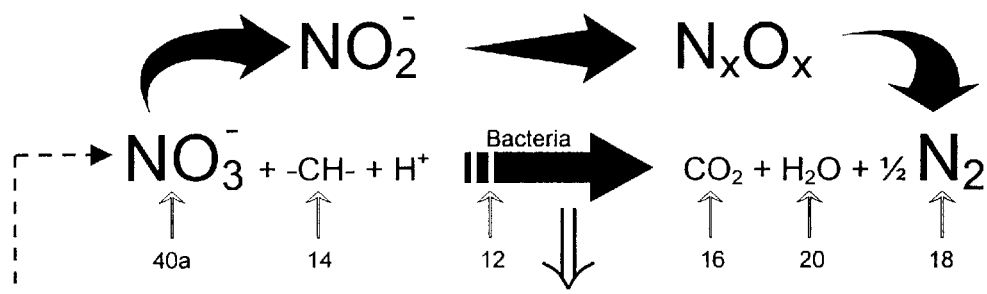
FIG. 10 is a schematic diagram of the anaerobic bioremediation system of the present invention showing the generic stoichiometric equations for the bioremediation processes of converting organic contaminants into non-toxic byproducts, such as carbon dioxide, nitrogen gas and water via denitrification.
Figure 10:
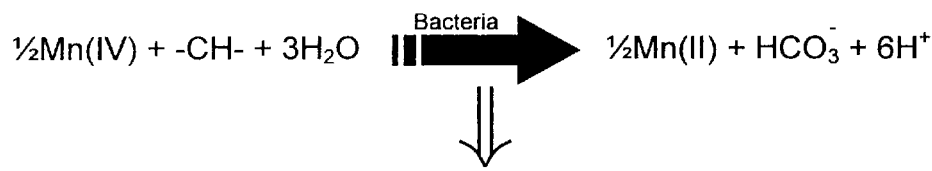
Figure 10:
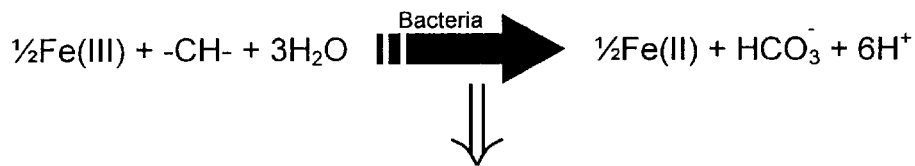
Figure 10:
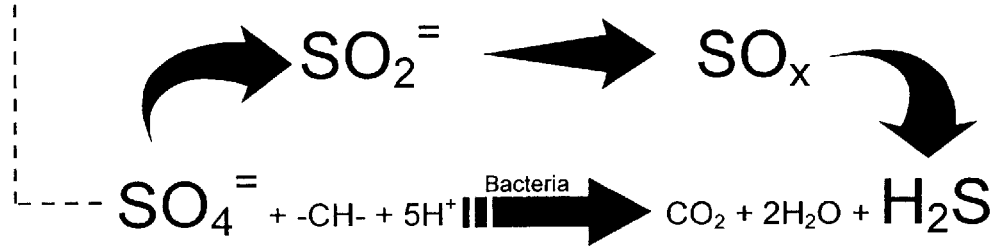
Figure 11:
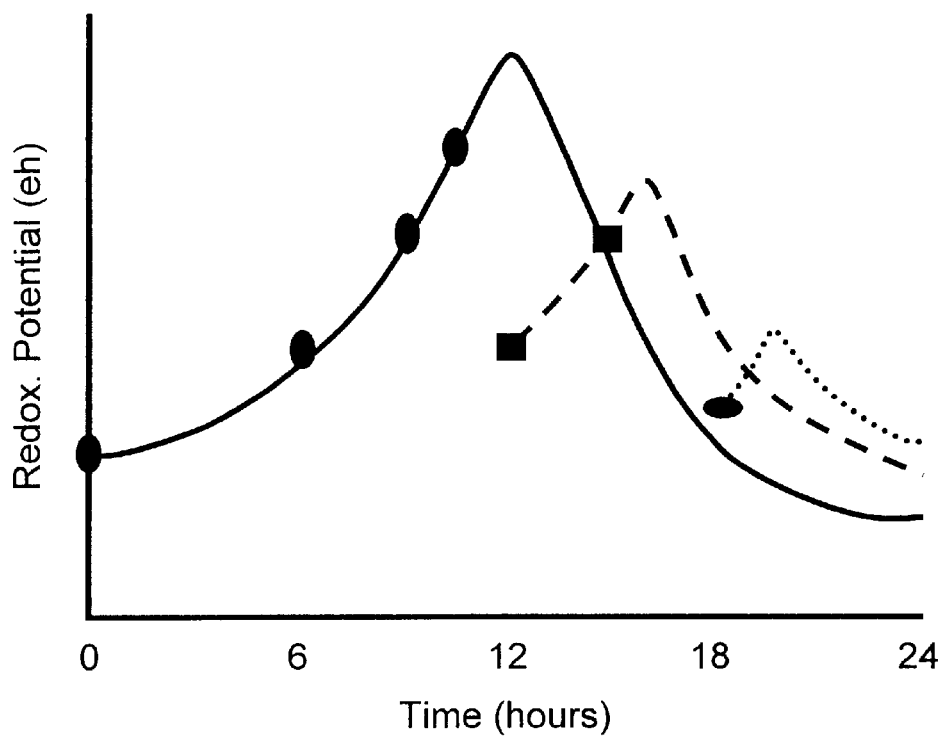
FIG. 11 is a schematic diagram showing a typical application of the use of the chemical compositions to facilitate the cycling of redox conditions and microbial respiration pathways in-situ beginning with denitrification followed by manganese-reduction, iron-reduction and sulfate-reduction and returning again to denitrification.

The use of chemical compositions 40 through 46 in the present invention provides a means for stimulating various redox conditions and microbial respiration pathways in-situ within the contaminated geologic media to enhance the growth of MRP anaerobic microorganisms and to optimize contaminant biodegradation and/or biotransformation by such microorganisms. In addition, use of chemical compositions 40 through 46 in the present invention provide a means for cycling through a series of redox conditions in-situ within the contaminated geologic media as illustrated in FIG. 10. Redox cycling within the contaminated geologic media in-situ is achieved by using one or more chemical compositions 40 through 46 in such a manner so as to stimulate a temporal and/or spatial succession of redox conditions and anaerobic respiration pathways in the subsurface. A typical application of the use of chemical compositions 40 through 46 facilitates redox cycling beginning with denitrification followed by manganese-reduction, iron-reduction and sulfate-reduction and returning again to nitrate reduction as shown on FIG. 11. For example, chemical compositions 40, 41, 43 and/or 44 are used to stimulate denitrification, followed by the use of chemical compositions 43, 44, 45 and/or 46 to stimulate manganese-reduction, iron-reduction and/or the reduction of other metals which can serve as microbial electron acceptors, followed by the use of chemical composition 42 to promote the growth of anaerobic bacteria via sulfate-reduction, followed by the use of chemical compositions 40, 41 and/or 43 to return again to denitrifying conditions. Because of the nature of the chemical compositions, methods and apparatus of the present invention, this invention also provides a means for varying such redox cycles to meet site-specific conditions or otherwise difficult contamination problems. The aforementioned cycling of redox conditions as facilitated by the present invention provides for the stimulation of a much more diverse community of MRP anaerobic microorganisms than could otherwise be achieved by other methods, which in turn provides a means of optimizing contaminant biodegradation and/or biotransformation in-situ within contaminated geologic media.

In addition, the use of chemical compositions 40 through 46 provides a means for providing MRP anaerobic bacteria with macronutrients and micronutrients needed to sustain bacterial growth and to promote biodegradation and/or biotransformation of organic and inorganic contaminants. For example, in addition to nitrate and/or other anaerobic electron acceptors, bacteria also require macronutrients such as inorganic nitrogen (e.g., ammonium) and phosphate. Bacteria utilize ammonium and similar forms of nitrogen to help synthesize proteins and other complex organic molecules. However, excessive ammonium concentrations can inhibit denitrifying bacteria such as certain Pseudomonas spp., and other MRP anaerobic bacteria. Moreover, research related to the present invention has shown that ammonium is produced in adequate quantities for biosynthesis as a result of dissimilatory nitrate reduction by Geobacter spp. and other MRP anaerobic microorganisms. Accordingly, the present invention minimizes or eliminates ammonium addition, allowing native anaerobic microorganisms to produce and/or recycle ammonium from microbiological wastes.

Bacteria also require phosphate for the production of nucleic acids, phospholipids, and other biochemicals as well as for the maintenance of adequate levels of nucleoside 5' triphosphates such as adenosine-triphosphate (ATP), the most common intracellular "energy-molecule." Some researchers have shown that the availability of 10–20 mg/l of phosphate ($PO_4^{-3}$) is typically sufficient to stimulate the biodegradation of aromatic hydrocarbons such as benzene, toluene, ethylbenzene and xylenes (BTEX) in ground water. However, most phosphate salts cause precipitates to form close to the injection well screens because of the reactive geochemistry between phosphate and the cations naturally present in geologic media. Accordingly, the present invention uses sodium hexametaphosphate and/or other ringed or linear polyphosphates for phosphate addition which helps overcome the typical fouling problems encountered by using other forms of phosphate. In addition, this invention provides a means of providing chelating agents to minimize abiotic reactions between phosphate and the naturally occurring cations in the geologic media.

Trace metal micronutrients, including, but not limited to, iron, molybdenum, copper, cobalt, manganese, boron and zinc are also important to the growth of denitrifying bacteria and other MRP anaerobic bacteria. These trace metals are required in the key enzymatic processes by which nitrate-reducing bacteria and other MRP anaerobes metabolize carbon sources such as hydrocarbons, halogenated solvents, pesticides, hazardous wastes and the like. For example, previous research reported in the literature has indicated that the addition of $\geq 10$ μg/l of key trace metals along with nitrate and phosphate facilitated the more effective degradation of BTEX compounds relative to the addition of nitrate and phosphate alone. Although these micronutrients are important to the growth of MRP anaerobic bacteria, research related to the operational use of the present invention, including experience in various geologic settings and contaminant conditions, has shown that the soil and ground water at each of these sites provides an adequate supply of these micronutrients. Therefore, the bioremediation system 10 of the present invention and the applications thereof minimize or eliminate the need for micronutrient addition, as the interaction of the chemical compositions 40 through 46 with the naturally reducing and anaerobic conditions at typical contamination sites enhances micronutrient availability and transfer in-situ within the contaminated geologic media.

The substrate which is used as an electron donor within the contaminated geologic formation for anaerobic biodegradation could include organic chemical compounds or contaminants including petroleum-based hydrocarbons, halogenated hydrocarbons and solvents, polychlorinated biphenyls (PCB's), dioxin, pesticides, and other toxic/hazardous wastes. Examples of typical petroleum hydrocarbons include gasoline, diesel fuel, fuel oils and lubricating oils, as well as gasoline and diesel additives such as methyl tertiary butyl ether (MTBE), ethanol, tertiary butyl alcohol (TBA) and the like. Examples of typical halogenated hydrocarbons and solvents that are used as a carbon source by MRP anaerobic bacteria during the remediation of a contaminated site could include carbon tetrachloride, tetrachloroethylene, tetrachloroethane, trichloroethylene, 1,1,1,-trichloroethane, 1,1,2-trichloroethane, 1,2-dichloroethylene, chloroform, methylene chloride, 1,2-dibromoethane, 1,2-dichloroethane, vinyl chloride, trichlorofluoromethane (Freon 113), and the like. Typical pesticides, herbicides, insecticides, mitacides, and nitroaromatic compounds being remediated at a contaminated site could include dinoseb (2-(1-melkylpropyl)-4,6-dinitrophenol, DDT, DDD, DDE, Diazanon™, chlordane, malathion, trinitrotoluene (TNT), dinitrotoluene (DNT), toxaphene, and the like. Typical inorganic contaminants and/or hazardous-wastes being remediated could include cyanides, cobalt-60, hexavalent chromium, uranium (VI), and other transition metals with the potential for reduction from higher valence states to lower valence states.

Bioremediation Processing Apparatus 50

The bioremediation processing apparatus 50 for the anaerobic bioremediation system 10 of the preferred embodiment of the present invention is represented in FIGS. 1 through 4 of the drawings. The bioremediation processing apparatus 50 is the delivery and feeding mechanism for transporting the nutrient fluid chemical composition 40 to the contaminated geologic formation 30 in order to stimulate anaerobic biodegradation, detoxification and transformation of toxic organic and inorganic compounds into harmless and safe end-products.

Figure 2:
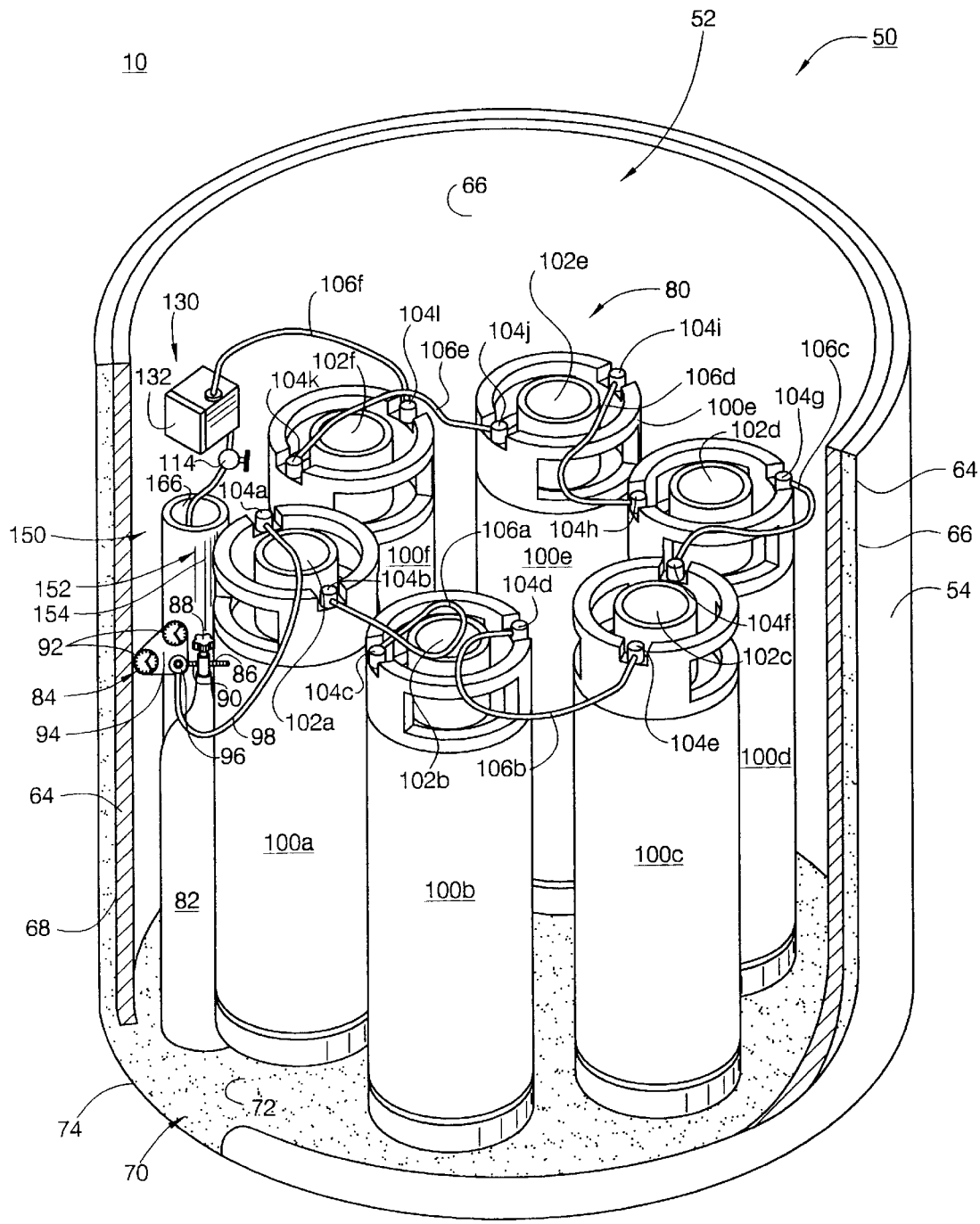
FIG. 2 is a front perspective view of the anaerobic bioremediation system of the preferred embodiment of the present invention showing the subsurface housing containing the bioremediation processing apparatus and its component parts contained therein; and in operational use. It is noted that there is an alternate configuration for connecting the bioremediation processing apparatus as shown in the following two figures.

The bioremediation processing apparatus 50, as shown in FIGS. 1 to 3, includes a metal or concrete housing component 52, a dispensing apparatus assembly 80 for dispensing of chemical composition 40; an electronic control assembly 130 for electronically metering the chemical nutrient composition 40; and a well component assembly 150 for delivering of chemical nutrient composition 40 to the contaminated geologic formation 30. Bioremediation processing apparatus 50 includes a cylindrical subsurface housing 52 made of metal or concrete having an outer cylindrical bentonite seal layer 54. Housing 52 also includes an outer manhole cover 58 having an insulation layer 60 attached to the cover inner wall member 62. In addition, sub-surface housing 52 includes a cylindrical wall member 64 having inner and outer surface walls 66 and 68, and a bottom wall member 70 being a gravel layer. Bottom gravel wall member 70 further includes a top surface wall 72 and a bottom surface wall 74. Bottom wall member 70 includes a circular hole opening 76 within the gravel layer for receiving the upper end 154 of well casing 152. Insulation layer 60 on cover 58 protects the nutrient chemical composition 40 within the plurality of product canister tanks 10a to 10f of dispensing apparatus assembly 80 from freezing.

Figure 3A:
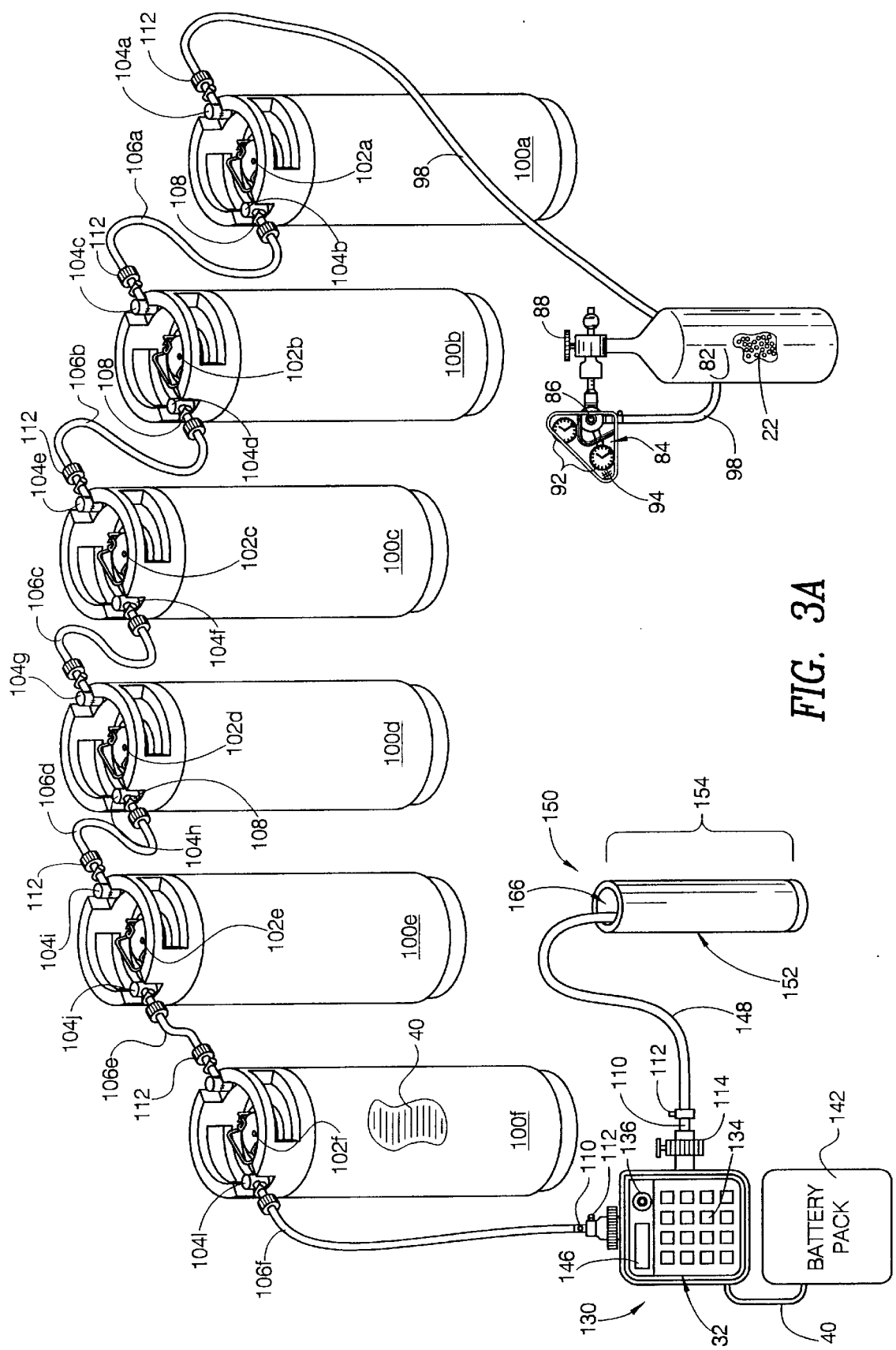
FIG. 3A is a front perspective view of the anaerobic bioremediation system of the preferred embodiment of the present invention showing the dispensing apparatus assembly and its component parts contained therein and the electronic control assembly and its component parts contained therein. The product canisters are operated in series using this set-up.

The dispensing apparatus assembly 80, as shown in detail by FIGS. 1, 2, and 3A of the drawings, includes a carrier gas cylinder 82 for holding of inert gas 22 having a gas regulator assembly 84, a plurality of stainless steel product canister tanks 100a to 100f for holding of the chemical nutrient composition 40 therein having removable lids 102a to 102f, and a plurality of quick disconnect couplings 104a to 104l for tanks 100a to 100f. A plurality of jumper line tubing 106a to 106f is attached to the aforementioned couplings 104a to 104l for connecting each of the product canister tanks 100a to 100f in series. In addition, the plurality of quick disconnect couplings 104a to 104l and the plurality of jumper line tubing 106a to 106f use a plurality of hose barb adapters 108a to 108j and 110 and a plurality of stainless steel hose clamps 112a to 112j for connecting the aforementioned quick disconnect couplings 104a to 104j and jumper line tubing 106a to 106f with each other.

Figure 3B:
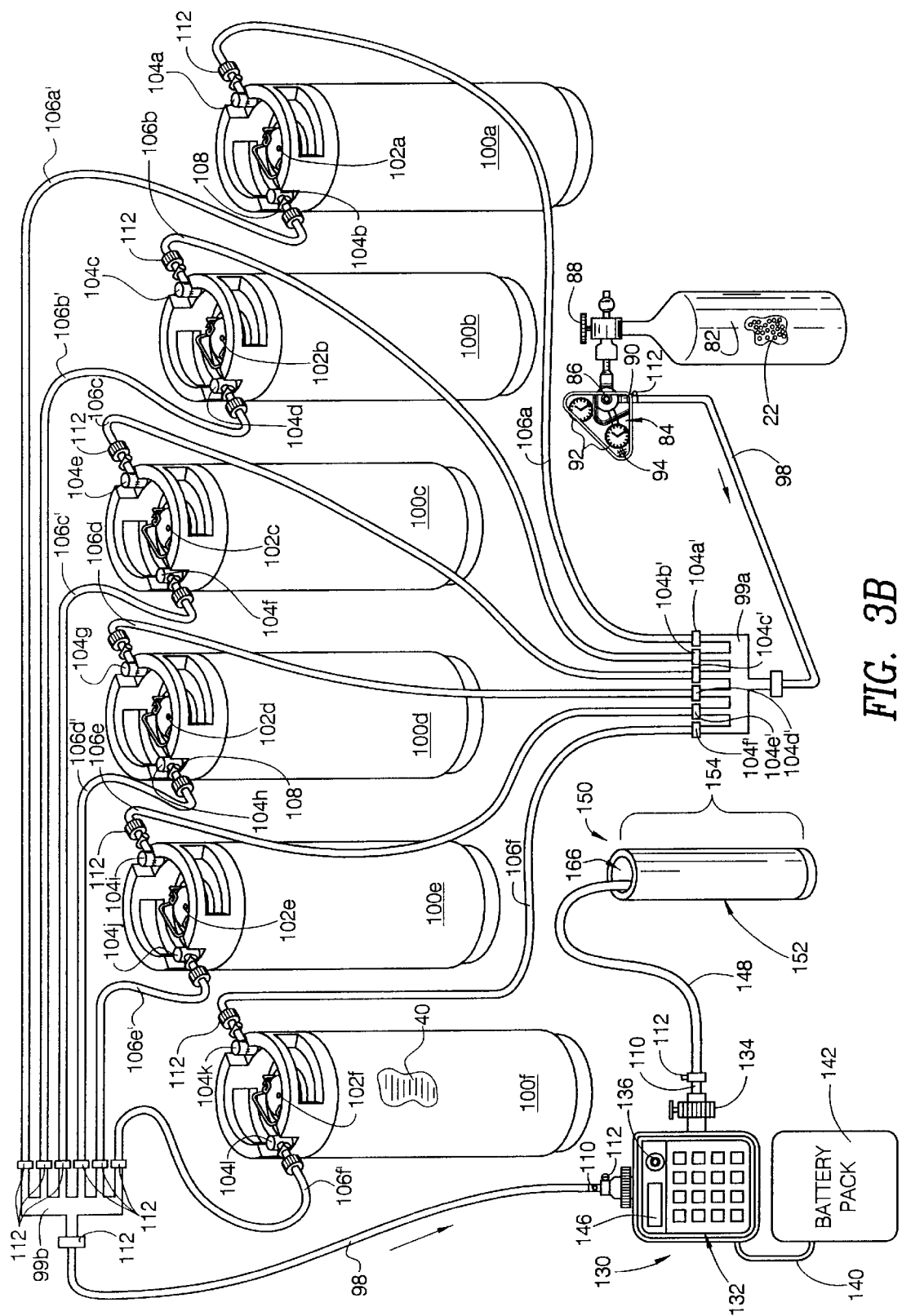
FIG. 3B is a front perspective view of the anaerobic bioremediation system of the preferred embodiment of the present invention showing an alternate dispensing apparatus assembly and its component parts contained therein and the electronic control assembly and its component parts contained therein. The product canisters are operated in parallel using this alternate set-up. Although the other Figures show the dispensing apparatus assembly configured as shown in FIG. 3A (series product canister operation), it should be noted that the system can also be set up and operated using the parallel product canister configuration depicted in FIG. 3B.
Figure 4:
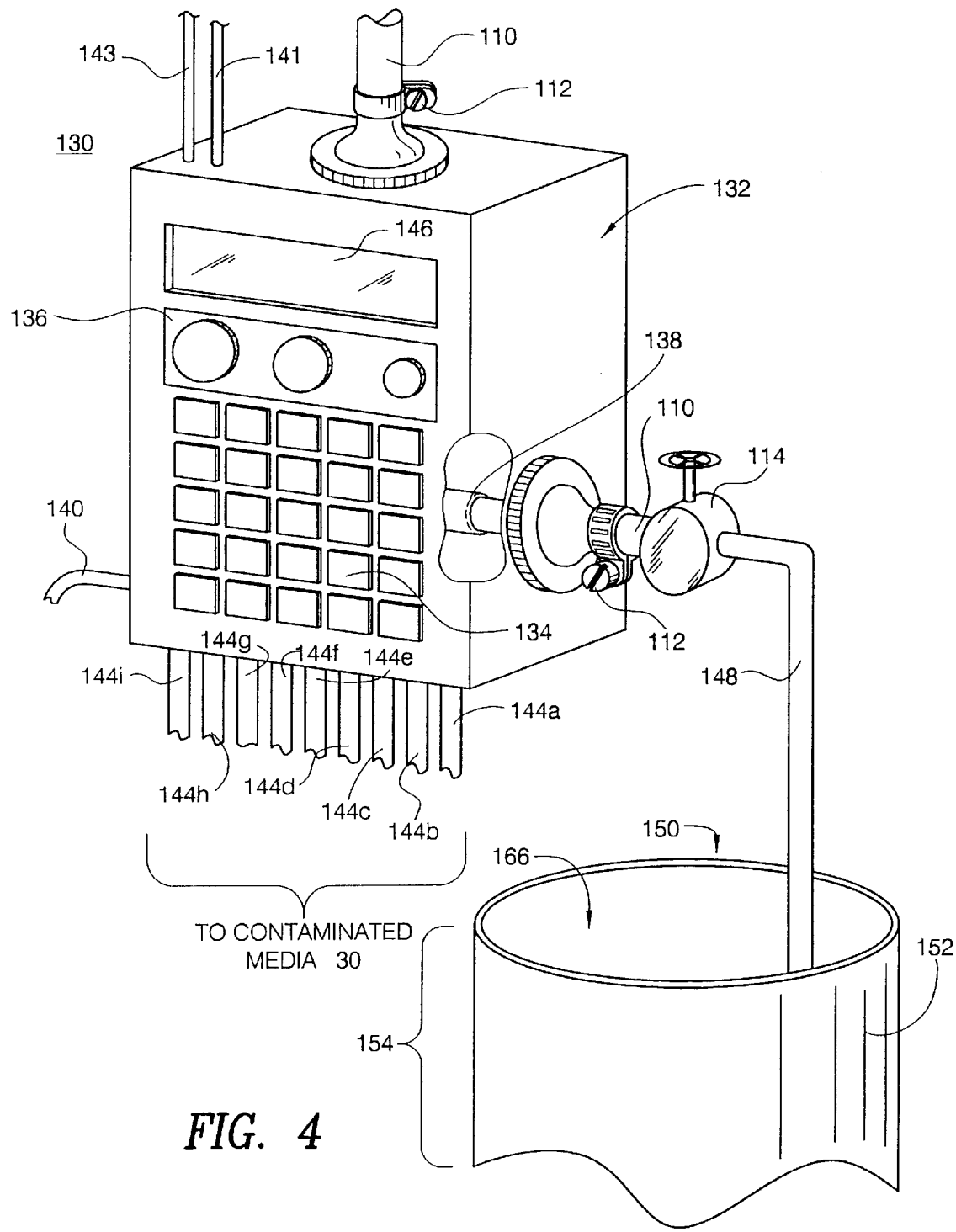
FIG. 4 is a front perspective view of the anaerobic bioremediation system of the preferred embodiment of the present invention showing the electronic control assembly and its component parts contained therein.

In using the alternate set-up of the dispensing apparatus as depicted in FIG. 3B, manifold 99a would be used with a plurality of jumper line tubing (106a to 106f) connecting the manifold to the individual product canister tanks 100a to 100f, which would be operated in parallel rather than in series. Jumper lines 106a' to 106f' would connect each individual product canister tank discharge to manifold 99b, which would discharge to the logic controller, as shown in FIG. 3B.

The gas regulator assembly 84 for the carrier gas cylinder 82 includes a gas regulator shut-off valve 86, a barbed-stem outlet line 90 and in-line pressure gauges 92a and 92b; there is a separate shut-off valve 88 for gas cylinder 82. Attached to gas regulator assembly 84 is a regulator gauge protection cage 94, and flexible link-up tubing 98 for connecting to the first product canister tank 10a when the product tanks operated in series.

In addition, the dispensing apparatus assembly 80 further includes a manually operated ball valve 114 which connects to the electronic control assembly 130 on one end and to well 152 on the other end via connecting tubing 148.

The electronic control assembly 130 includes a logic controller 132 having a logic controller programmer component 134 for inputting a program or algorithm and executing such, and a timing element component 136 for electronically opening and closing an automated ball valve 138 in accordance with the program or algorithm, for precise metering of the chemical composition 40 to the contaminated geologic formation 30 at precise time intervals. In addition, logic controller 132 is powered by a battery pack 142 via electrical lines 140 for operating in the field where no electrical power outlets are available. It is noted that battery pack 142 and electrical line 140 can be contained within the logic controller 132, as well as externally as shown in the drawings. Chemical nutrient composition 40 is discharged through the automatic ball valve 138 when it is in the open position, into a length of discharge tubing 148, as shown in FIGS. 2 through 5.

Logic controller 132 further includes as an metering of the chemical composition 40 to the contaminated geologic formation 30, as an option a plurality of digital and/or fiber-optic sensors 144a to 144i for the in-situ monitoring of the static-water levels, the changes in static-water levels, the in-situ concentrations of each of the components of the chemical compositions or the by-products thereof, the rate of use of one or more of the components of the chemical compositions by the MRP microorganisms, the total estimated mass of the microorganisms in-situ, the biomass growth rate of the naturally occurring MRP microorganisms in-situ, the conversion rates of the converted end-products being generated by the MRP microorganisms, the pH and/or redox potential of the saturated geologic media or biomass, and the temperature of the saturated geologic media and other pertinent measurable data needed. Logic controller 132 also includes a display component 146 for displaying the sensor outputs; as well as a telecommunication data link and telemetry phone lines 141 and 143, respectively, for communicating the controller data to and receiving program changes from an off-site location.

Bioremediation processing apparatus 50 further includes an optional pressurized water feed 109, as shown in FIG. 1.

The pressurized water feed consists of a pressurized water line 111, connected to a pressurized water supply main; a pressure-reducing valve 113; a logic controller 132'; a manually-operated ball valve a 114'; and discharge tubing 115. The purpose of the optional pressurized water feed is to (1) provide additional fluid to periodically flush the concentrated fluid composition through the contaminated geologic media-30 at precise rates and time intervals, and (2) to increase saturation of the contaminated geologic media.

The well component assembly 150, as shown in FIG. 1, includes a PVC well riser 152 having an upper end section 154 and a lower end PVC screen section 156 having slotted openings 158 within. The well PVC riser 152 is surrounded by backfilled soil cuttings 160 and a bentonite seal 162 at the upper end section 154 of the well PVC riser 152; and is surrounded by a Morie (or equivalent) sand pack 164 at the lower end section 156 of the well PVC riser 152. In addition, the well PVC riser 152 includes an inlet opening 166, a plurality of discharge outlet openings 168s and a bottom end cap 169. The chemical nutrient composition 40 is discharged into the contaminated geologic media 30 through discharge openings 168s via the PVC screen 156 of well 152.

Figure 8:
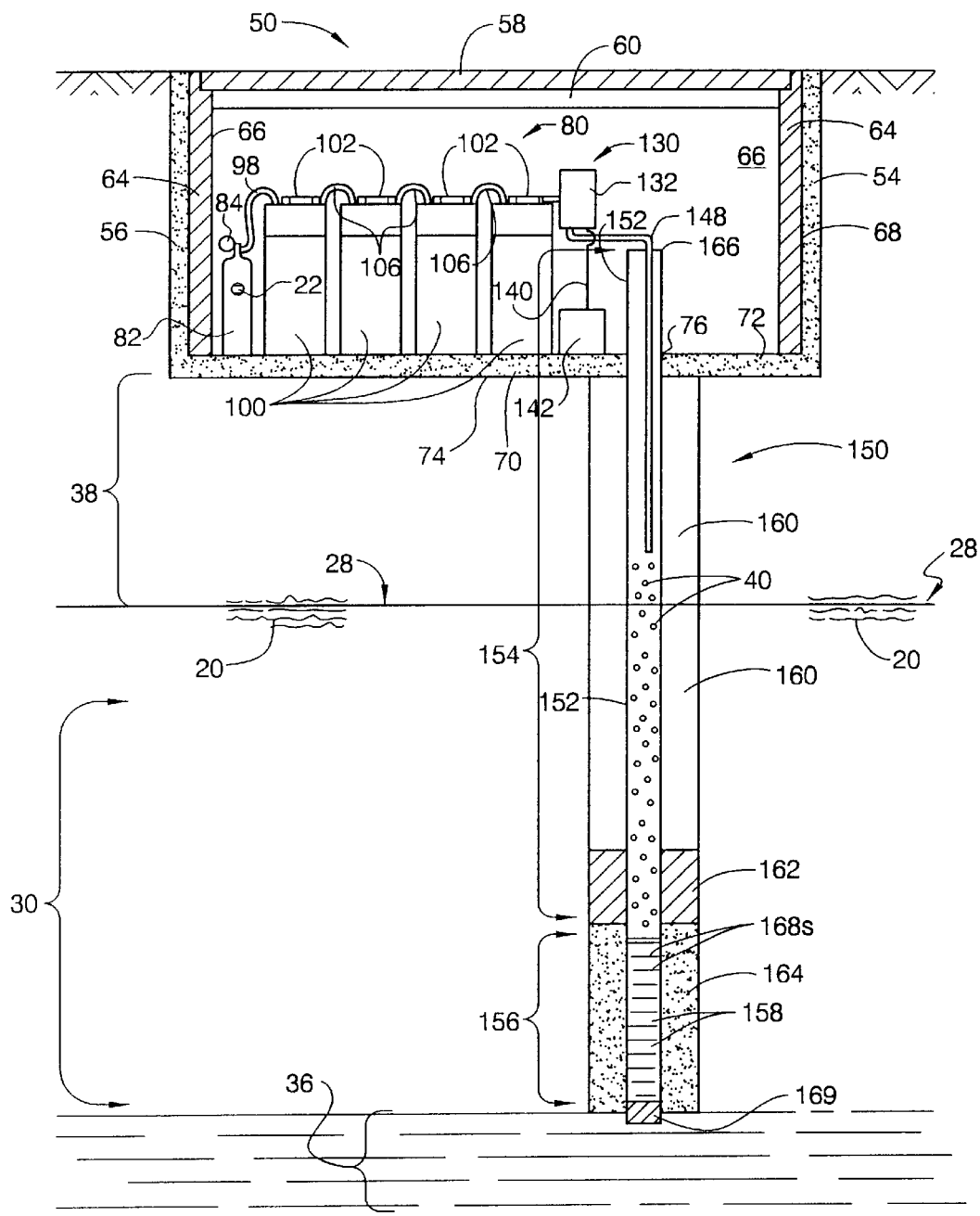
FIG. 8 is a side elevational view of the anaerobic bioremediation system of the alternate embodiment of the present invention showing the bioremediation processing apparatus for use in bioremediation applications involving dense non-aqueous phase liquid contaminants (DNAPLs) having a dispensing apparatus assembly, an electronic control assembly and a well component assembly; and in operational use.
Figure 9:
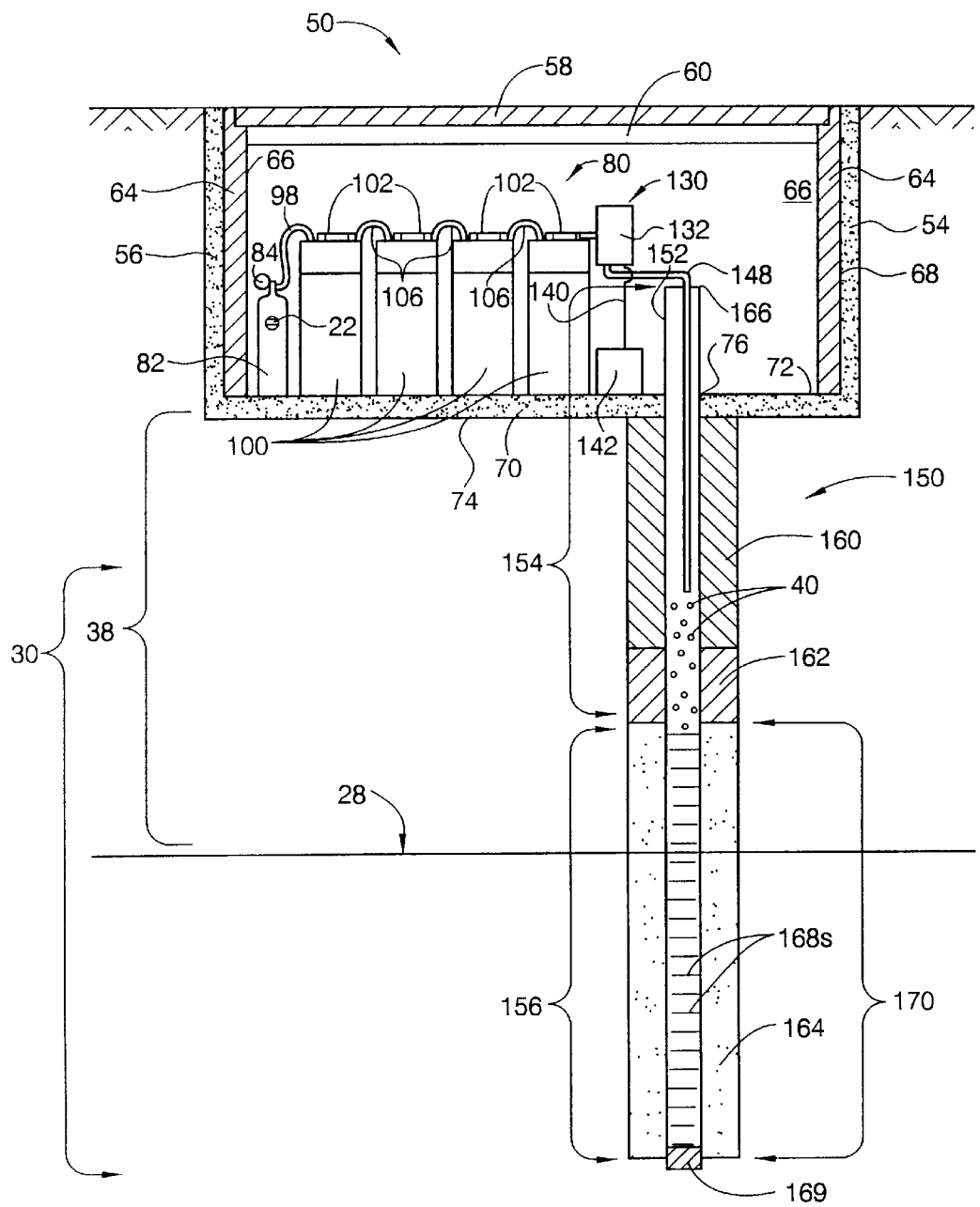
FIG. 9 is a side elevational view of the anaerobic bioremediation system of the alternate embodiment of the present invention showing the bioremediation processing apparatus for use in bioremediation applications involving light non-aqueous phase liquid contaminants (LNAPLS) having a dispensing apparatus assembly, an electronic control assembly and a well component assembly; and in operational use.

The use of well 152 installed within a contaminated geologic formation 30 is to form an interface area 170 for bioremediation applications including light non-aqueous phase liquid contaminants (LNAPLs) where these contaminants have a specific gravity of less than one, as shown in FIG. 9, and/or installed to form an interface area 170 with one or more hydrogeologic aquitards 36 for the bioremediation applications involving dense non-aqueous phase liquid contaminants (DNAPLs) where these contaminants have a specific gravity of more than one, as shown in FIG. 8. The use of the PVC screen 156 within well 152 at depths of no more than 0.5 ft. to 10 ft. below the seasonal low of the water table level 28, as shown in FIG. 9 of the drawings, is for the bioremediation applications involving light non-aqueous phase liquid contaminants (LNAPLs) where these contaminants have a specific gravity of less than one.

Outlet tubing 148 connected to the manual ball valve 114 extends into the inlet opening 166, as shown in FIG. 1, for discharging of chemical nutrient composition 40 into the contaminated geological formation 30 through multiple outlet opening 168s.

Subsurface Vapor Inerting System 200

Figure 5:
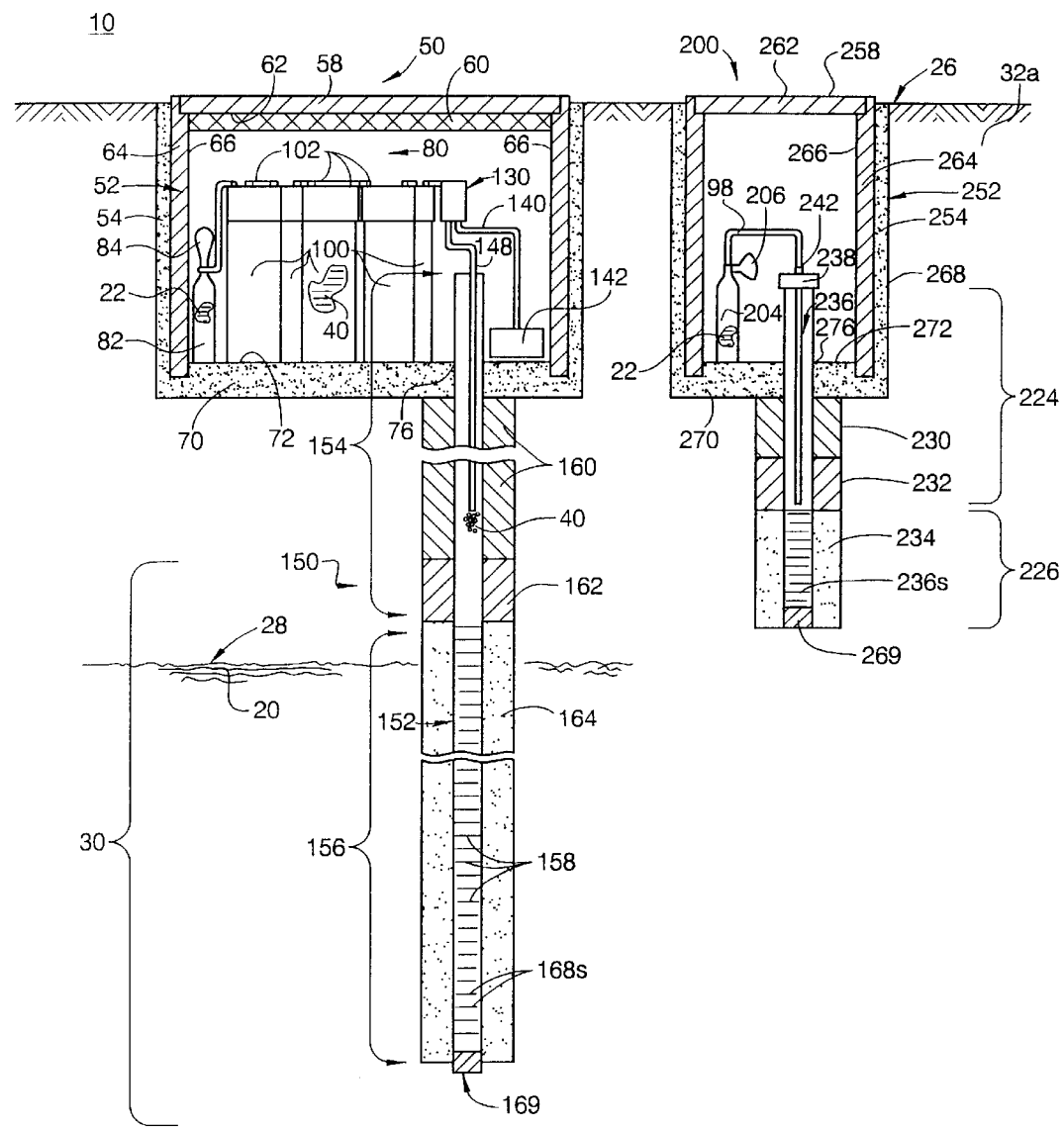
FIG. 5 is a side elevational view of the anaerobic bioremediation system of the preferred embodiment of the present invention showing the bioremediation processing apparatus having the dispensing apparatus assembly, the electronic control assembly, and the first well component assembly; and the vapor suppression system and a second well component assembly; with both systems being in operational use.
Figure 6:
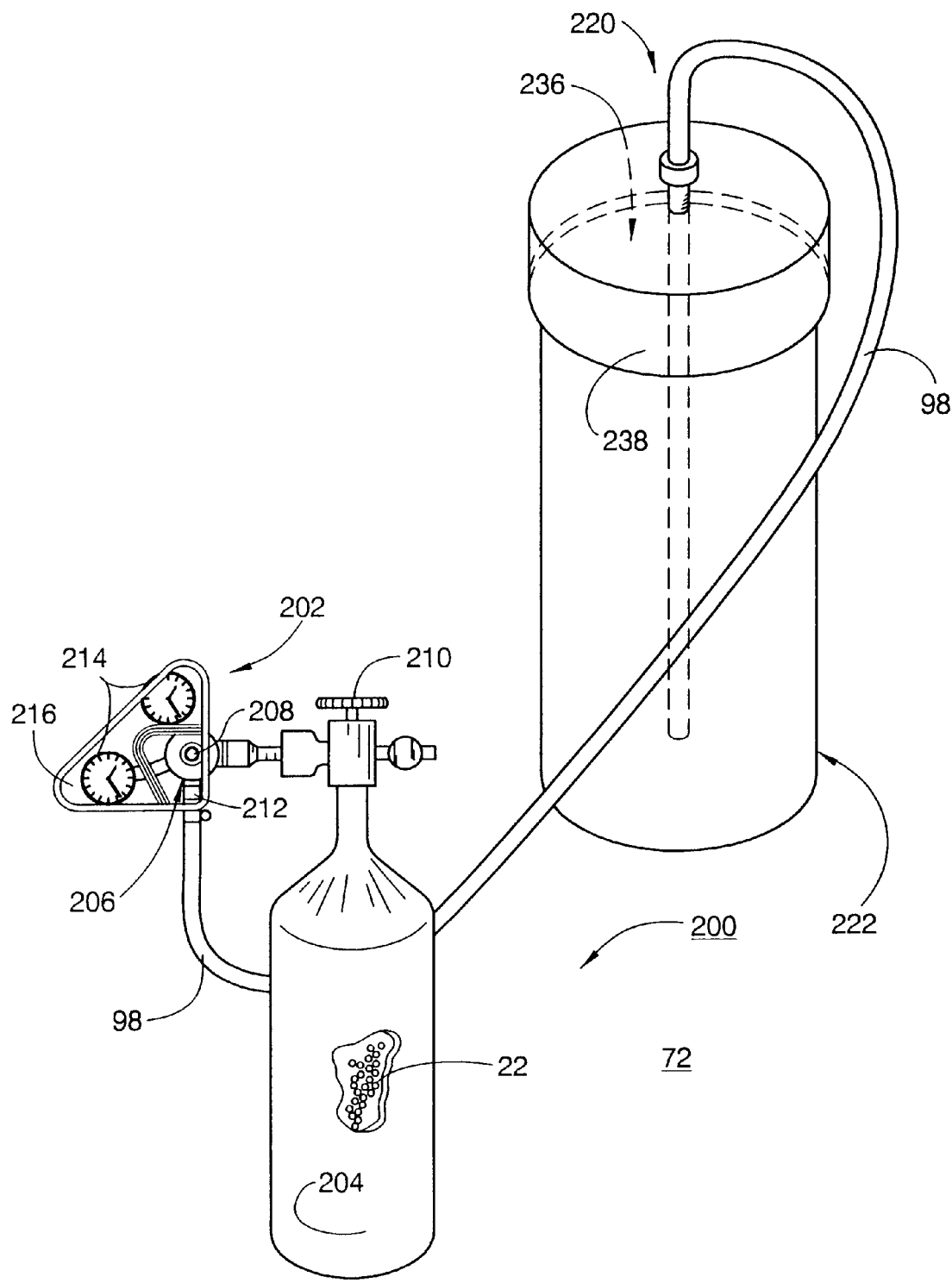
FIG. 6 is a front perspective view of the anaerobic bioremediation system of the alternate embodiment of the present invention showing the vapor suppression system and its component parts contained thereon and in operational use.

The present invention further includes an improved and optional subsurface vapor-inerting system 200, as depicted in detail by FIGS. 5 and 6 of the drawings. The subsurface vapor-inerting system 200 is used for the reduction of oxygen gas ($O_2$) concentrations 24 within the vadose zone section 38 of the contaminated geologic site 30 which provides fire safety prevention that reduces and/or eliminates flash fires and/or explosion hazards associated with oxygen gas 24 and hydrocarbon contaminants 14 in the vadose zone 38 where the potential for such fire and explosion hazards exists. The subsurface vapor-inerting system 200 includes an inert gas assembly 202 for dispensing of an inert gas 22; and a well component assembly 220 for transferring the inert gas 22 to the contaminated geologic formation 30. The well component assembly 220 of the vapor-inerting system 200, as shown in FIGS. 5 and 6, is installed close to the well component assembly 150, and is constructed in a similar manner to well component assembly 150, except for the screened PVC section 226 interval within the well riser 222 which is no more than 1 ft to 10 ft above the seasonal high of water table level 28. The compressed inert gas 22 such as argon gas (A) is dispensed within the well 222 in a manner so as to maintain the gravitational flow or passive flow of the argon gas 22 5E into the vadose zone 38 of the geologic media 30 in order to reduce any potential for fire and explosions in the vadose zone 38. This vapor-inerting system 200 is also used to provide an improved mechanism for the enhancement of anaerobic bioremediation processes, as the argon gas 22 enables the maintenance of anaerobic conditions within the contaminated geologic media being remediated.

The inert gas assembly 202 includes an inert gas cylinder 204 having a gas regulator 206 with a gas regulator valve 208, a shut-off valve 210, an outlet connection component 212 and pressure in-line gauges 214a and 214b for maintaining a precise outlet pressure to properly blanket the vadose zone 38 with the argon gas (A) 22 suppressing vapors produced by the subsurface contaminants. Gas regulator 206 in addition includes a regulator gauge protection cage 216, and flexible tubing 98 for discharging of the argon gas (A) 22 into the well 222.

The well component assembly 220, as shown in FIGS. 5 and 6, includes a PVC well riser 222 having an upper end section 224 and a lower end PVC screen section 226. In addition, well component assembly 220 includes a separate subsurface housing unit 252 made of concrete or metal for containing both the inert gas assembly 202 and well component assembly 220 therein. Housing 252 includes an outer cylindrical bentonite layer 254, and an outer manhole cover 258. In addition, sub-surface housing 252 includes inner and outer surface walls 266 and 268 and a bottom wall member 270 being a gravel layer. Bottom wall member 270 includes a circular hole opening 276 within the gravel layer for receiving the upper end section 224 of well casing 222. The PVC well riser 222 is surrounded by backfilled soil cuttings 230 and a bentonite seal 232 at the upper end section 224 of the well PVC riser 222; and is surrounded by a Morie (or equivalent) sand pack 234 at the lower end section 226 of the well PVC riser 222. In addition, the well PVC riser 222 includes an inlet opening 236, a plurality of discharge side outlet openings 236s and a bottom end cap 269. Inlet opening 236 includes a well cap 238 having a disconnect coupling/fitting 242 thereon.

Figure 7:
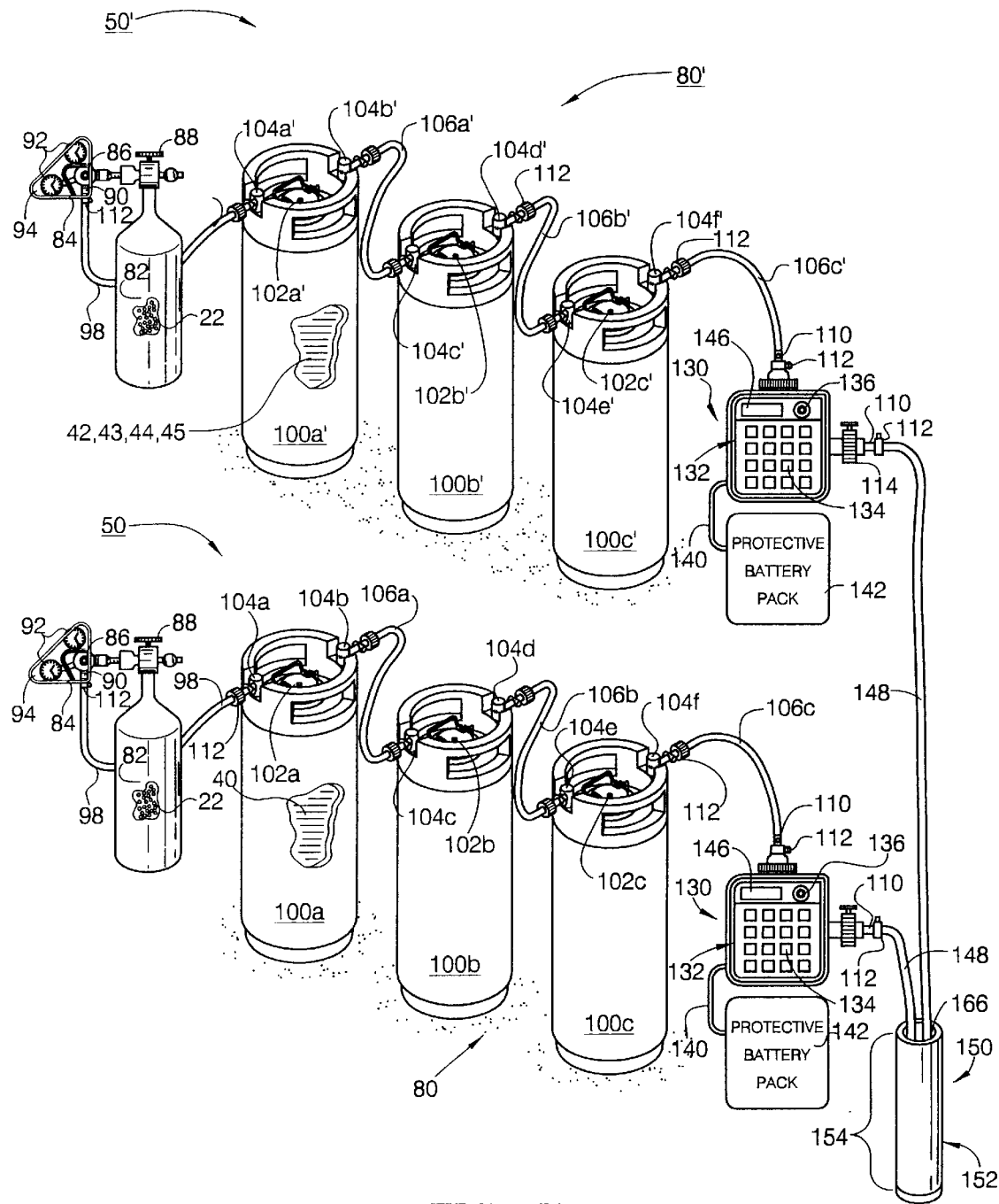
FIG. 7 is a front perspective view of the anaerobic bioremediation system of the preferred and alternate embodiments of the present invention showing dual dispensing apparatus assemblies and dual electronic control assemblies being electrically interconnected for the alternate feeding of the standard nutrient composition and alternative nutrient compositions into the well component assembly.

As shown in FIG. 7, the preferred chemical nutrient composition 40 and alternative chemical nutrient compositions 41, 42, 43, 44 and 45 can be used in dual or other multiple dispensing apparatus assemblies 80 and 80', with dual or multiple electronic assemblies 130 and 130' for the predetermined alternate feeding of the preferred composition 40 and alternative compositions 41, 42, 43, 44 and 45 into the well component assembly 150 via inlet opening 166. This allows the preferred and alternative chemical nutrient compositions 40, 41, 42, 43, 44 and 45 to be received into the contaminated geologic media 30 in precisely timed pulses in a manner which enables the temporal cycling of redox pathways so as to optimize the growth and health of MRP anaerobic microorganisms and to optimize contaminant degradation by such microorganisms 12.

Operation of the Present Invention

In operation, the anaerobic bioremediation system 10 facilitates the anaerobic biodegradation, detoxification, and/or transformation of contaminant compounds such as petroleum hydrocarbons, halogenated solvents, polychlorinated biphenyls, dioxins, pesticides, cyanides, toxic metals, hazardous wastes and the like that have been released into surface environments and/or subsurface geologic media 30 whereby such contaminants are transformed into safe, less-toxic and/or harmless end-products.

In addition, the bioremediation system 10, also facilitates the anaerobic biodegradation, detoxification, and/or transformation of toxic organic and inorganic compounds in contaminated geologic media 30 under a wide range of reducing redox conditions and anaerobic respiration pathways including denitrification, manganese-reduction, iron-reduction and sulfate-reduction. Another application of the use of the anaerobic bioremediation system 10, with regard to the above, would be to facilitate the suppression of hydrogen sulfide ($H_2S$), related sulfides, mercaptans and the undesirable odors related to these compounds produced as a result of the metabolic activity of sulfur-reducing microorganisms via the stimulation and maintenance of denitrifying, manganese-reducing and iron-reducing conditions.

The well component assembly 150 provides a proper fluid-exchange interface with the contaminated geologic media 30 which in turn provides a means of infiltration of the chemical nutrient composition 40, optional water feed 20, and carrier gas 22 within the contaminated geologic formation 30 for stimulating and facilitating the bioremediation of the toxic organic and inorganic compounds by the indigenous anaerobic microorganisms 12 located within the aforementioned geologic formation 30.

In addition, the present invention also provides for an improved subsurface vapor-inerting system 200 designed to reduce oxygen gas ($O_2$) concentrations 24 in the vadose-zone 38 of the contaminated geologic media 30 in order to reduce or eliminate the potential for flash fires and/or explosion hazards in the subsurface areas where the potential for such fire and explosion hazards exists. The well component assembly 220 of the vapor-inerting system 200, as shown in FIG. 5, is installed adjacent to the well component assembly 150. The PVC well riser 222 of well component assembly 220 delivers the inerting argon gas 22 to the vadose zone 38 of the contaminated geologic media 30 while simultaneously the PVC well riser 152 of well component assembly 150 delivers the chemical nutrient composition 40 and the argon carrier gas 22 to the contaminated area of geologic media 30 in order to stimulate the indigenous anaerobic microorganisms 12 at that interface area 170 within the aforementioned contaminated geologic media 30. The vapor inerting system 200 can also be used independently of the anaerobic bioremediation system 10.

Initial Operation of the Systems after Construction

To put the bioremediation processing apparatus 50 and the vapor inerting system 200 into operation initially after construction, several preparation steps are provided for, such as the construction and placement of well component assemblies 150 and 220 at the contaminated geologic site 30, construction and placement of each housing member 52 and 252 at a subsurface level within the soil strata of the contaminated geologic media 30, and the placement of each well component assemblies 150 and 220 within each housing member 52 and 252 via circular hole openings 76 and 276 each for receiving the upper end sections 154 and 224 of well piping 152 and 222, respectively, as shown in FIG. 5 of the drawings.

The chemical nutrient composition 40 is made-up in a large make-up mixing tank (not shown) or in the actual product tank canisters 100a to 100f at a convenient off-site premise or at the contaminated geologic site 30 when logistics permit it by adding the dry chemicals, the liquid chemicals and diluent together in the proper order, and mixing them thoroughly. If the chemical nutrient composition 40 is made-up in the larger mixing tank, the nutrient composition 40 is then transferred to the plurality of product tank canisters 10a to 100f via a portable pump (not shown). After the product tanks 100a to 100f are filled with the nutrient composition 40, their respective lids 102a to 100f are closed shut and the product tanks 100a to 100f are then pressurized by argon gas (A) 22 thereby sealing their respective lids 102a to 102f to prevent leaks of the nutrient composition 40 contained therein. The product tank canisters 10a to 100f are then transported to the contaminated geologic site 30.

Another preparation step is the development of a computer program for the logic controller 132 of the electronic control assembly 130 where the algorithms in the program are based on mathematical models of one or more of the following operating parameters for the bioremediation system 10:

1) The rates of the diffusion-based transport of the biogeochemical compounds in the chemical nutrient composition 40 being used in the contaminated geologic media 30.
2) The uptake rates of biogeochemical compounds in the chemical nutrient composition 40 by the naturally occurring MRP microorganisms 12 in-situ for degrading the contaminants.
3) The rates, duration and repetition of cycles for
    a) biomass growth followed by
    b) biomass decay in-situ.
4) The duration and repetition and/or cycling of various redox pathways In conjunction with the preceding step, a plurality of digital and/or fiber-optic sensors 144a to 144i may be connected to logic controller 132 and regularly calibrated to monitor and/or control the delivery of the chemical nutrient composition 40 based upon real-time measurements of one or more parameters in-situ at selected locations within the contaminated geologic media 30. For example, such parameters may include in-situ monitoring of the following:

1) Static-water levels;
2) Meteorologically induced changes in static-water levels;
3) The rates each of the electron-acceptors are being used by the MRP microorganisms 12;
4) The biomass growth rate of the naturally occurring MRP microorganisms 12 in-situ;
5) The relative metabolic activity of the naturally occurring MRP microorganisms 12 in-situ;
6) The conversion rates of the converted end-products being generated by the MRP microorganisms 12;
7) The pH and/or redox potential within the contaminated geologic media 30;
8) The temperature within the contaminated geologic media 30.

The operator (being at the site) removes the outer manhole cover 58 having a foam insulation 60 attached from the top of the subsurface apparatus housing 52 allowing the operator access to the well component assembly 150 within housing 52. The operator then places the plurality of product tanks 100a to 100f, and the electronic control assembly 130 within the subsurface housing 52, such that the product tanks 100a to 100f are placed on the bottom floor 72 in a circular fashion such that the last product tank 100f having the electronic control assembly 130 attached thereto is adjacent and in close proximity to the well component assembly 150.

The product tanks 100a to 100f are then joined together via the plurality of quick disconnect couplings 104a to 104l having the jumper-line tubing 106a to 106f attached thereto, if being operated in series as shown in FIG. 3a. If being operated in parallel as shown in FIG. 3b, the jumper line tubing is connected from the manifolds 99a and 99b to the product tanks 100a to 100f. Once all of the digital and/or fiber optic sensors 144a to 144i have been calibrated (if the optional sensors are to be used) and the logic controller 132 is properly programmed, the operator then connects the battery power pack 142 via electrical power line 140 for supplying electrical power to the logic controller 132. The operator then connects the logic controller 132 to the last product tank 100f via quick disconnect coupling 104l (for series operation). The gas cylinder 82 having argon gas (A) 22 (which is still located at ground level 26 above the apparatus system 50 for easier access) is then connected to the first product tank 100a (for series operation) or to the gas manifold 99a (for parallel operation) via the quick disconnect coupling 104a. The operator now opens the valve 88 on gas cylinder 82 and the gas pressure, as shown on the in-line gas pressure gauge 92, is set to be within the range of 5-to-10 psig or approximately 5 psig above the minimum pressure required via gas regulator valve 86 on the gas regulator assembly 84 to initiate the flow of the chemical nutrient composition 40 out of the product tanks 100a to 100f with the argon carrier gas (A) 22 and into the product tubing 148. Simultaneously, as the above step is taking place, the operator also checks that the logic controller 132 is manually actuated and the ball valve 114 is opened, and the logic controller 132 is set and adjusted to the desired flow of chemical nutrient composition 40 out of the controller 132 and into the product tubing 148. Once the nutrient composition 40 is flowing freely through the dispensing apparatus assembly 80 of the bioremediation processing apparatus 50 and out the end of product tubing 148, the logic controller program component 134 and timing element 136 of logic controller 132 are checked again or modified if desired by the operator. Then the logic controller 132 is manually closed and set to an automatic setting by the operator. The product tubing 148 is then placed into the well apparatus 150. The gas cylinder 82 which is already connected to the first product tank 100a or gas manifold 99a is then placed into subsurface housing 52 next to the first product tank 100a or gas manifold 99a.

As noted above, if the product tanks are to be operated in parallel as shown in FIG. 3B, the gas cylinder 82 is connected to the gas manifold 99a, and jumper tubing from the inlet of each product tank is connected to the gas manifold. Jumper lines are then connected to the discharge of each product tank at one end and to the liquid manifold 99b on the other end, as shown in FIG. 3B. The rest of the set-up process as described above for series operation, is the same for parallel product tank operation.

If the optional water feed is installed and is to be used, manual control valve 114' would be opened and adjusted until the desired flow rate of water is discharged from tubing 115. The automatic control valve 138' contained within water feed logic controller 132' would then be manually closed, and the logic controller programmed to operate as needed. Water feed tubing 115 would then be placed into the well apparatus 150.

The man hole cover 58 having the insulation layer 60 is then placed back on top of the subsurface housing 52 and the anaerobic bioremediation system 10 is now operating to facilitate the biodegradation, biotransformation or detoxification of the contaminants 14 at interface area 170 of contaminated media 30 into harmless end products including carbon dioxide gas ($CO_2$) 16, nitrogen gas ($N_2$) 18 and water ($H_2O$) 20.

In the event that an above-grade installation for the bioremediation system 10 is preferred, the installation and set-up procedures for the dispensing apparatus 80 would be the same as described above with the exception that the said dispensing assembly would be installed in a suitable above-ground housing.

If the vapor suppression and inerting system 200 is being used in conjunction with the dispensing apparatus assembly 80, the operator removes outer manhole cover 258 and places the inert gas assembly 202 in close proximity to the well component assembly 220, such that the inert gas cylinder 204 having argon gas (A) 22 therein stands on the bottom gravel floor 272 of housing 252. The operator then checks the gas regulator 206 and the component fitting 212 and attaches tubing 98 to well cap disconnect fitting 242 on well cap 238, so that the flexible discharge tubing 98 can discharge the argon gas (A) 22 into the well riser 222 of well component assembly 220. The operator then opens valve 210 on gas cylinder 204 and adjusts the gas regulator valve 208, such that the argon gas (A) 22 is set to flow and run at the minimum setting at which the argon gas (A) 22 is discharged into the well riser 222. The minimum measurable rate on the pressure gauge 214 of gas regulator 206 for discharging the argon gas (A) 22 into the well riser 222 has a setting of about 1 psig.

The purpose of gas cylinder 204 is to maintain the gravitational flow or passive flow of the argon gas (A) 22 into the vadose zone 38 of the contaminated geologic media 30 in order to suppress vapors from the subsurface contaminants which have the potential to cause fire and explosions in that area. Also, the argon gas (A) 22 enables the maintenance of anaerobic conditions within the contaminated geologic site 30 for a continuous enhancement of the anaerobic bioremediation processes taking place at interface area 170. The manhole cover 258 is then placed on housing 252 by operator for the completion of this step of initially activating the vapor suppression system 200. In the event that an above-grade installation for the vapor suppression system 200 is preferred, the installation and set-up procedures for the inerting assembly 202 would be the same as described above with the exception that the said inerting assembly would be installed in a suitable above-ground housing.

Regular Operation and Maintenance of Systems after Initial Set-Up

During the normal course of processing as just previously described, the operator is further preparing additional sets of product tanks 100a' to 100f', 100a" to 100f", etc. having preferred chemical nutrient composition 40 or alternate compositions 41, 42, 43, 44 or 45 therein. After the product tanks are filled, their lids 102a' to 102f', 102a" to 102f", etc. are closed and the product tanks 100a' to 100f' and 100a" to 100f" are then pressurized to seal their lids 102a' to 102f' and 102a" to 102f" to prevent leaks. The aforementioned sets of product tanks having either the preferred nutrient composition 40 or alternate compositions 41, 42, 43, 44 or 45 therein are in a stand-by mode at the off-site preparation location, ready to replace the first set of product tanks 100a to 100f when they are empty. This aforementioned procedure is also done with several additional gas cylinders 82' and 204', and 82" and 204", etc. having argon gas (A) 22 therein which are also in a stand-by mode at the off-site preparation location and are ready to replace the first gas cylinders 82 and 204 when they are emptied of the argon gas (A) 22. It should be noted that the operator-in-charge, periodically at pre-determined timed intervals, checks the dispensing apparatus assembly 80 and the electronic control assembly 130 for proper functioning according to the pre-determined standards initiated for the anaerobic bioremediation system 10 in degrading the contaminants 14 at the geologic work site 30. These checks are generally performed at the same time that the product tanks 100a to 100f and gas cylinders 82 and 204 are replaced.

When the operator decides it is time to replace the product tanks 100a' to 100f' based on preset feed rates and frequency, the manhole cover 58 is removed from the subsurface housing 52 allowing access to the dispensing apparatus assembly 80 and the electronic control assembly 130 within subsurface housing 52, as shown in FIGS. 1 and 5 of the drawings. The operator then closes the shut-off valve 88 on gas cylinder 82 and removes the quick disconnect coupling 104a connecting gas cylinder 82 having argon gas (A) 22 from the first product tank 100a in-line. Then the gas cylinder 82 is lifted out of the housing 52.

The operator then removes the quick disconnect coupling 104l connecting the last product tank 100f to the tubing 106f from the logic controller 132, such that the logic controller 132 is then disconnected and set aside. If the logic controller 132 is in an open mode, the operator then manually closes the automated control ball valve 138. The operator then continues to remove and set aside the remaining quick disconnect couplings 104b to 104k and jumper line tubing 106a to 106f from the empty product tanks 100a to 100f that were connected in series, as shown in FIGS. 2 and 3 of the drawings. The empty product tanks 100a to 100f are then removed from the subsurface housing 52 and are set aside at ground level 26. The replacement product tanks 100a' to 100f' having nutrient composition 40 therein are then placed onto the bottom floor 72 of the subsurface housing 52 in a circular fashion, as shown in FIG. 2 of the drawings. The operator then puts back on all of the quick disconnect couplings 104b to 104k and jumper line tubing 106a to 106f onto the replacement product tanks 100a' to 100f' in order to connect these product tanks 100a' to 100f' in series. Then the operator puts back on the quick disconnect coupling 104l onto the last product tank 100f', where coupling 104l' connects to barb connector 110 for reattaching the logic controller 132 to the last product tank 100f'. Next, the operator sets a replacement carrier gas cylinder 82' of compressed argon gas (A) 22 at ground level 26 and re-attaches the quick disconnect coupling 104a and the hose clamp 112 on hose 98 thereby connecting the gas cylinder 82 to the first product tank (in-line) 100a'. The operator now re-opens the valve 88 and adjusts the regulator valve 86 on the gas regulator assembly 84, such that the in-line pressure gauge 92 of gas regulator 84 is set to a 5 psig setting, or set at approximately 5 psig above the minimum pressure required to initiate the flow of the chemical nutrient composition 40 out of the product tanks 100a' to 100f'. The operator now adjusts the logic controller 132 such that automatic ball valve 138 is manually re-set to the opened position, and where the manual ball valve 114 attached on the discharge side of the logic controller 132 is re-set to adjust the nutrient composition 40 flow at a desired rate for flowing into the geologic media 30. Once the nutrient composition 40 is flowing freely through the dispensing apparatus assembly 80 and out of product tubing 148, the operator then manually closes automatic valve 138 and re-checks the logic controller program component 134 for the feed algorithm previously inputted. The logic controller 132 is then manually closed and set to an automatic setting by the operator. The operator then places product tubing 148 into well assembly 150 and places gas cylinder 82 (which is already connected to the first product tank 110a), into subsurface housing 52. Lastly, the operator again replaces the manhole cover 58 having insulation 60 on top of the subsurface housing 52 to prevent freezing of the nutrient composition 40 during the winter months.

If the vapor suppression system 200 is in use, manhole cover 258 is removed and the shut off valve 210 on gas cylinder 204 is closed. Tubing 98 is then disconnected from well cap 238 via quick disconnect coupling 242, and then the gas cylinder 204 is lifted out of the housing 252 by the operator.

The replacement inert gas cylinder 204' is then placed by the operator back onto the bottom gravel floor 272 of the subsurface housing 252 and adjacent to well component assembly 220, as shown in FIG. 5 of the drawing. The operator then checks the gas regulator 206, the connection fitting 212 via tubing 98 being properly attached to the inert gas cylinder 204 and attaches tubing 98 to the well cap quick disconnect fitting 242 on well cap 238, as shown in FIG. 5 of the drawings. The operator then adjusts the valve 210 on gas cylinder 204 to an open position, and adjusts the valve 208 on gas regulator assembly 206 such that the argon gas (A) 22 is set to flow and run at the minimum setting at which the argon gas (A) 22 is discharged into the well riser 222. The minimum measurable rate on the pressure gauge 216 of gas regulator 206 for discharging the argon gas (A) 22 into the well riser 222 has a setting of about 1 psig.

The continuous operation of the bioremediation processing apparatus 50 of the anaerobic bioremediation system 10 for degrading contaminants 14 at a particular geologic site 30 may take up to several months. During this time, operators of the anaerobic bioremediation system 10 will repeat the aforementioned steps and procedures of replacing the gas cylinders 82 and 204 having argon gas (A) 22 therein and product tanks 100a to 100f having chemical nutrient compositions 40 to 45 therein numerous times until the project has been completed. Also, the operators on an ongoing basis will periodically re-calibrate the electronic control assembly 130 for the proper flow of the nutrient compositions 40 to 45 into the interface area 170 of geologic media 30.

In the event that an above-grade installation for the anaerobic bioremediation system 10 and the vapor suppression system 200 is utilized, the installation and set-up procedures for the dispensing apparatus 80 and inert gas assembly 202 would be the same as described above with the exception that the said dispensing apparatus and inerting assembly would be operated and maintained within a suitable above-ground housing.

Hydrogen Sulfide Generation and Suppression

As noted in the Overview of the invention, bacterial utilize electron acceptors in the order of their decreasing energy yield (Gibbs Free Energy $[_\Delta G]$ in KJ/mole $CH_2O$). In theory, as the availability of a higher-energy electron acceptor wanes (e.g., $O_2$), conditions become favorable for microbial respiration with lower-energy electron acceptors (e.g., $NO_3$, $MN(IV)$, $Fe(III)$, and $SO_4$). The natural sequence of microbial utilization of electron acceptors in the environment is summarized in Table 1. In the absence of higher-energy electron acceptors, sulfates serve as the electron acceptor for oxidation by anaerobic microorganisms. Sulfate is reduced to hydrogen sulfide ($H_2S$) under anaerobic conditions; hydrogen sulfide has a characteristic rotten egg odor, is extremely toxic, and is corrosive to metals. Hydrogen sulfide can also be biologically oxidized to sulfuric acid which is also extremely corrosive.

By providing a preferential electron acceptor (such as oxygen in the form of nitrous oxide, nitrate, Fe(III) or Mn (IV)) where there is potential for $H_2S$ formation due to the presence of sulfate, bacteria will preferentially use the higher-energy yielding electron acceptor, and $H_2S$ will not be formed. The result is suppression of malodorous and problematic compounds that would otherwise be produced.

EXAMPLES OF USE FOR THE ANAEROBIC BIOREMEDIATION SYSTEM

Example 1

Active Service-Station Site Gasoline Release, Northern New Jersey

Site Description and Type of Release

A release of an unknown quantity of gasoline occurred from piping associated with the former UST systems removed and replaced at the site in the late 1980's.

Site Hydrogeology

The overburden sediments at the site comprise fine-to-medium glaciofluvial sands with varying amounts of silt. The water table ranges from 6-to-10 ft. below grade. A compact, silty-clay aquitard of glaciolacustrine origin is present at depths ranging from 15-to-19 ft. below grade. Bedrock was not encountered during drilling and the bedrock aquifer is not believed to have been impacted. A stream wraps around the site and its surroundings approximately 200 ft. downgradient and ground-water flow conditions have been interpreted fluctuate in response to local surface-water/ground-water interaction and meteorological events.

Investigation and Remediation

A subsurface investigation was performed by Geovation from 1993–1996 which included the installation of seven monitor wells and collection of soil and ground water samples. The results of the investigation indicated the presence of gross soil and ground-water contamination, with as much as 2.1 ft. of gasoline in a site monitor well. Two anaerobic bioremediation systems (ABSs) were installed, one next to the pump island and one adjacent to the tank field, with minimal disruption of site commercial activities. Operation of the ABSs has had a negligible impact on gas-station operations.

Baseline contaminant levels included more than 2 ft. of free product, MTBE- and 1,2-DCA-amended gasoline in the most contaminated well and >16–42 mg/L total BTEX in the next most contaminated well.

Results

To date, free product thicknesses have decreased approximately 90 percent and dissolved phase BTEX compounds have decreased by as much as 88 percent in the site well with the highest BTEX level prior to remediation activities. BTEX concentrations in this well decreased by 92% over the first three months of treatment from >16 mg/L to 3.4 mg/L. Microbiological assays and microscopic investigation documented a rapid response of the microbial community to ABS treatment as evidenced by a 30-fold increase in bacterial biomass in the downgradient monitor well closest to one of the ABSs, by the second week of treatment. The analysis of biochemical markers, including phospholipid fatty acid (PLFA) analyses, indicated that ABS treatment had increased the biomass and improved the overall health and growth rate of the microbial community. These data also indicated a shift in the composition of the microbial community towards gram-negative, more rapidly growing species in response to ABS treatment. Gene probe analysis of the microbial community indicated the presence of strict anaerobes, such as Geobacter spp. and the like. Additional assays are underway to further investigate the anaerobic microbial community at the site.

Example 2

Fuel Oil Release at a Former Bank, Brooklyn, N.Y.
Site Description and Type of Release Two separate releases of fuel oil occurred totalling on the order of 3,500 gal. from a UST used to heat the facility.
Site Hydrogeology Overburden sediments at the site are predominantly medium to coarse sands associated with glacial-outwash and/or a kame-delta, with ground water at approximately 17 ft. below grade Bedrock was not encountered and it is not believed to have been impacted.
Investigation and Remediation Upon discovery of the release, the property owner's consultant removed contaminated soils from the source area and installed a series of monitor/recirculation wells for a carbon treatment system. Several pump-and-treat system wells were installed in the basement of the building and significant amounts of free product were detected and recovered. Monitoring data indicated that most of the remaining free-product contamination was trapped beneath the building. Extensive pump and treat efforts were met with limited effectiveness in that free-product recovery waned and free-product persisted in monitor wells across the site. Accordingly, the engineering firm in charge evaluated several bioremediation alternatives and Geovation was selected to conduct a anaerobic bioremediation program to augment the ongoing remediation activities. Three of Geovation's anaerobic bioremediation systems (ABS) 10 were installed at key locations in the contaminant plume and operated beginning in late November 1996.
Results Prior to remediation in November 1996, free-product thicknesses in site monitor wells were on the order of 0.35 ft. From late November through early December, several storm events occurred which caused product levels in site wells to increase to approximately 0.5 ft. in thickness as the water table rose through contaminated vadose-zone soils. As of late February 1997, approximately 3 months after initiation of remediation activities and approximately 2 weeks after cessation of the initial anaerobic bioremediation treatment program, free product was eliminated in most site wells, with only a sheen observed in several downgradient locations. Additional ABS operation initiated in late March 1997 has eliminated residual free-product in site wells.

Throughout the course of the ABS operation, several obvious indications of enhanced biological activity were documented including the "carbonation" of site ground water resulting from carbon dioxide produced by the microbial community as well as documented increases in the number and size of bacteria present in site monitor wells. A twenty-to-thirty-fold increase in biomass was documented over the first two weeks of ABS operation. The most dramatic increases in microbial biomass occurred in the wells with the highest levels of contamination. The presence of a biomass slurry was routinely observed in site monitor wells and in the oil/water separator tanks associated with the pump and treat system. ABS operation is continuing at this time to address remnant dissolved phase contamination.

Advantages of the Present Invention

An advantage of the present invention is that it provides for an anaerobic bioremediation system for the anaerobic biodegradation, detoxification and transformation of toxic organic and inorganic contaminants within contaminated geologic media into non-toxic compounds without further production of regulated wastes or other undesirable by-products that effect air, water and soil at the geologic site.

Another advantage of the present invention is that it provides for an anaerobic bioremediation system for in-situ treatment of geologic media containing organic and inorganic contaminants that are metabolizable or transformable by naturally occurring indigenous, MRP anaerobic bacteria including denitrifying-, manganese-, iron- and sulfate-reducing microorganisms within the contaminated geologic media at the site.

Another advantage of the present invention is that it provides for an anaerobic bioremediation system having apparatus which enables the delivery of electron acceptors, nutrients, chelating agents, surfactants, a diluent and an inert carrier gas to promote the growth of indigenous, MRP anaerobic bacteria including denitrifying-, manganese-, iron- and sulfate-reducing microorganisms such that the metabolism or transformation of the contaminants by these microorganisms can easily take place without the use of implanted microorganisms at the contaminated site.

Another advantage of the present invention is that it provides for an anaerobic bioremediation system having apparatus which enables the electron acceptors, nutrients, chelating agents, surfactants, a diluent and an inert carrier gas to be more readily and rapidly dispersed in the contaminated geologic media, thereby becoming more widely available to MRP anaerobic bacteria within the contaminated geologic media.

Another advantage of the present invention is that it provides for an anaerobic bioremediation system the electron acceptors, nutrients, chelating agents, surfactants, a diluent and an inert carrier gas in a chemical composition and form that is readily utilizable by indigenous, MRP anaerobic bacteria including denitrifying-, manganese-, iron- and sulfate-reducing microorganisms within the contaminated geologic media.

Another advantage of the present invention is that it provides for an anaerobic bioremediation system that has the means to supply electron acceptors, nutrients, chelating agents, surfactants, a diluent and inert carrier gas as well as the capacity to modify the pH, redox potential and the availability of oxygen in the subsurface geologic media whereby the use of sodium hexametaphosphate and/or similar ringed and/or linear polyphosphates as the exclusive source of phosphate and the use of nitrate as both an electron acceptor and the main source of assimilated (i.e., nutrient) nitrogen, taken together with other unique aspects of the chemical compositions, enables a major improvement for the stimulation and growth of indigenous MRP microorganisms within contaminated geologic media.

Another advantage of the present invention is that it provides a means for stimulating several different microbial respiration pathways under different redox conditions in-situ by using one or more chemical compositions in such a manner so as to stimulate MRP anaerobic bacteria including denitrifying-, manganese-, iron- and sulfate-reducing microorganisms within the contaminated geologic media.

Another advantage of the present invention is that it provides for an anaerobic bioremediation system having a means for stimulating, alternating and/or cycling various redox conditions and microbial respiration pathways within the contaminated geologic media in-situ by using one or more chemical compositions in such a manner so as to stimulate a temporal and/or spatial succession of redox conditions in the subsurface in order to enhance the growth of MRP anaerobic microorganisms and to optimize contaminant biodegradation and/or biotransformation by such microorganisms.

Another advantage of the present invention is that it provides for an anaerobic bioremediation system having the capability for reducing flash fire and/or explosion hazards in the contaminated geologic media.

Another advantage of the present invention is that it provides for an anaerobic bioremediation system having apparatus that is simple and inexpensive to construct and use, and which enables efficient delivery and monitoring of the nutrients and electron acceptors for the optimum growth rate and kinetics of various indigenous, denitrifying and other MRP microorganisms in order to maximize the rate of degradation and transformation of the contaminants into non-toxic compounds by these indigenous MRP microorganisms.

Another advantage of the present invention is that it provides for an anaerobic bioremediation system having a process that is simple and inexpensive to operate, especially in the field on a large scale basis.

Another advantage of the present invention is that it provides for an anaerobic bioremediation system whose operation can be modified manually or automatically either on-site or from off-site locations based on real-time measurements of in-situ conditions.

Another advantage of the present invention is that it provides for an anaerobic bioremediation system having a process that can be performed rapidly and safely in the field and which results in the site meeting environmental clean-up standards set by various governmental agencies more rapidly and at a lower cost than can be accomplished with other methods.

A further advantage of the present invention is that it provides for an improved anaerobic bioremediation system that can be easily produced in an automated and economical manner and is readily affordable by various responsible parties, consultants, contractors, engineers, governmental agencies and corporate users.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A liquid chemical composition for anaerobic biodegradation, detoxification, and transformation of toxic organic and inorganic compounds in contaminated geologic media, being ammonium free, and comprising:

a) sodium nitrate in the range of one-fifth (0.2) to four (4) pounds per gallon of said chemical composition being the only source of nitrogen and being an electron acceptor;

b) A source of biologically hydrolyzable phosphorus being one or more of sodium hexametaphosphate and other ringed or linear polyphosphate compounds in the range of one twentieth (0.05) to five (5) pounds per gallon of said chemical composition;

c) a surfactant in the range of 0.01% to 10% by volume of said chemical composition;

d) a diluent; and e) one or more chelating agents.

2. A chemical composition in accordance with claim 1. further including one or more of the following chelating agents selected front the group consisting of citric acid, sodium citrate, nitrilotriacetic acid (NTA), ethylenediaminetetraacetic acid (EDTA) and equivalents thereof.

3. A chemical composition in accordance with claim 1, wherein the molar ratios of nitrate ($NO_3^-$) to phosphorus (P) are in the range of 2:1 to 50:1.

4. A chemical composition in accordance with claim 1, further including an inert gas as a carrier for said chemical composition.

5. A chemical composition in accordance with claim 4, wherein said inert gas is argon, neon, krypton or xenon.

6. A method of alternating the cycles of redox potential and/or the predominant microbial respiration pathway within the contaminated geologic media, by employing one or more liquid chemical compositions;

wherein the first chemical composition-being ammonium free, comprises sodium nitrate in the range of one-fifth (0.2) to four (4) pounds per gallon of said first chemical composition being the only source of nitrogen and being an electron acceptor; a source of biologically hydrolyzable phosphorus being one or more of sodium hexametaphosphate and other ringed or linear polyphosphate compounds in the range of one twentieth (0.05) to five (5) pounds per gallon of said first chemical composition; a surfactant in the range of 0.01% to 10% by volume of said first chemical composition; a diluent and one or more chelating agents;

wherein the second liquid chemical composition being ammonium free, comprises sodium nitrate, nitrous oxide; a source of biologically hydrolyzable phosphorus being one or more of sodium hexametaphosphate and other ringed or linear polyphosphate compounds: a surfactant; a diluent and one or more chelating agents;

wherein the third liquid chemical composition comprising a sulfate-containing ($SO_4^-$) electron acceptor chemical compound in the form of ferrous sulfate heptahydrate, sodium sulfate or other soluble salt of sulfate, a source of biologically hydrolyzable phosphorus being one or more of sodium hexametaphosphate and other ringed or linear polyphosphate compounds; a surfactant; a diluent and one or more chelating agents;

wherein the fourth chemical composition comprises a primary compound acting as a source of both nutrient nitrogen and two forms of eletron acceptor in the form of ferric nitrate nonahydrate; a sodium hexametaphosphate and other ringed or linear polyphosphate compounds; a surfactant; a diluent and one or more chelating agents;

wherein the fifth chemical composition comprises a primary compound acting as a source of electron acceptor nitrogen, nutrient nitrogen and micronutrient manganese, in the form of manganese nitrate, manganese nitrate tetrahydrate, or manganese nitrate hexahydrate; a source of biologically hydrolyzable phosphorus being oaf or more of sodium hexametaphosphate and other ringed or linear polyphosphate compounds; a surfactant; a diluent and one or more chelating agents;

wherein the sixth chemical composition comprises a chelating agent which makes transition metals including, but not limited to Mn(IV) and Fe(III) present in the geologic media more biologically available to MRP microorganisms, a source of biologically hydrolyzable phosphorus being one or more of sodium hexametaphosphate and other ringed or linear polyphosphate compounds; a surfactant; and a diluent;

comprising the steps of:
a) introducing one or more of said first to sixth chemical compositions into the contaminated geologic media for one or more specified periods of time;
b) subsequently introducing one or more of said first to sixth chemical compositions into the contaminated geologic media for one or more additional specified periods of time; and
c) repeating and/or alternating steps a) and b) until the levels of contaminants in the contaminated geologic media have been reduced.

7. A method of alternating the cycles of redox potential and/or the predominant respiration pathways of MRP anaerobic microorganisms within the contaminated geologic media in-situ, by exploring one or more liquid chemical compositions;

wherein the first chemical composition being ammonium free, comprises sodium nitrate in the range of one-fifth (0.2) to four (4) pounds per gallon of said first chemical composition being the only source of nitrogen and being an electron acceptor; a source of biologically hydrolyzable phosphorus being one or more of sodium hexametaphosphate and other ringed or linear polyphosphate compounds in the range of one twentieth (0.05) to five (5) pounds per gallon of said first chemical composition; a surfactant in the range of 0.01% to 10% by volume of said first chemical composition; a diluent and one or more chelating agents;

wherein the second liquid chemical composition being ammonium free, comprises sodium nitrate; nitrous oxide; a source of biologically hydrolyzable phosphorus being one or more of sodium hexametaphosphate and other ringed or linear polyphosphate compounds; a surfactant; a diluent and one or more chelating agents;

wherein the third chemical composition comprises a primary compound acting as a source of both nutrient nitrogen and two forms of electron acceptor in the form of ferric nitrate nonahydrate; a source of biologically hyrolyzable phosphorus being one or more of sodium hexametaphosphate and other ringed or linear polyphosphate compounds; a surfactant; a diluent and one or more chelating agents;

wherein the fourth chemical composition comprises a primary compound acting as a source of eletron acceptor nitrogen, nutrient nitrogen and micronutrient manganese, in the form of manganese nitrate, manganese nitrate tetrahydrate, or manganese nitrate hexahydrate; a source of biologically hydrolyzable phosphorus being one or more of sodium hexametaphosphate and other ringed or linear polyphosphate compounds; a surfactant; a diluent and one or more chelating agents;

wherein the fifth chemical composition comprises a chelating agent which makes transition metals, including, but not limited to Mn(IV) and Fe(III) present in-the geologic media more biologically, available to MRP microorganisms, a source of biologically hydrolyzable phosphorus being one or more of sodium hexametaphosphate and other ringed or linear polyphosphate compounds; a surfactant; and a diluent;

wherein the sixth chemical composition comprises a sulfate-containing ($SO_4^-$) electron acceptor chemical compound in the form of ferrous sulfate heptahydrate, sodium sulfate or other soluble salt of sulfate; a source of biologically hydrolyzable phosphorus being one or more of sodium hexametaphosphate and other ringed or linear polyphosphate compounds; a surfactant; a diluent and one or more chelating agents;

comprising the steps of:
a) performing a first phase of operation by adding one or more of said first to fourth chemical compositions into the contaminated geologic media for one or more specified periods of time at a specified delivery rate for promoting the growth of indigenous MRP anaerobic microorganisms via the denitrification pathway;
b) performing a second phase of operation by adding one or more of said third to fifth chemical compositions into the contaminated geologic media for one or more specified periods of time at a specified delivery rate for promoting the growth of indigenous MRP anaerobic microorganisms via microbial respiration pathways involving manganese-reduction, iron-reduction and/or the reduction of other metals;
c) performing a third phase of operation involving the addition of said sixth chemical composition for one or more specified periods of time at a specified delivery rate for promoting the growth of anaerobic bacteria via the sulfate-reduction pathway; and
d) repeating and/or alternating steps a), b), and c) until the level of contaminants in the contaminated geologic media are reduced.

8. The method of claim 6 whereby the specified number and duration of delivery events of said first to sixth chemical compositions promote the log-phase growth of the anaerobic biomass within the contaminated geologic media.

9. The method of claim 7 whereby the specified number and duration of delivery events of said first to sixth chemical compositions promote the log-phase growth of the anaerobic biomass within the contaminated geologic media.

10. The method of claim 6 further including the step of introducing into the contaminated geologic media no chemical composition for one or more specified periods of time so as to allow for the decay of the anaerobic biomass within the contaminated geologic media.

11. The method of claim 7 further including the step of introducing into the contaminated geologic media no chemical _composition for one or more specified periods of time so as to allow for the decay of the anaerobic biomass within the contaminated geologic media.

12. The method of any one of claims 8 to 11 whereby the periods of log-phase growth and decay of the anaerobic biomass are cycled and/or repeated so as to optimize the biodegradation, transformation or detoxification of organic and/or inorganic contaminants by MRP anaerobic microorganisms.

13. The method of any one of claims 6 and 7, further including the step of introducing into the contaminated geologic media a carbon co-substrate selected from the group consisting of ethanol, methanol, or acetate for one or more specified periods of time at a specified delivery rate for promoting the biodegradation, transformation or detoxification of organic contaminants by MRP anaerobic microorganisms.

14. The method of any one of claims 6 and 7, further including the step of introducing into the contaminated geologic media a primary carbon substrate selected from the group consisting of ethanol, methanol, or acetate for one or more specified periods of time at a specified delivery rate for promoting the biodegradation, transformation or detoxification of inorganic contaminants by MRP anaerobic microorganisms.

15. The method of claim 6 wherein one or more of the chelating agents are selected from the group consisting of citric acid, sodium citrate, nitrilotriacetic acid (NTA), ethylenediaminetetraacetic acid (EDTA) and equivalents thereof.

16. The method of claim 7 wherein one or more of the chelating agents are selected from the group consisting of citric acid, sodium citrate, nitrilotriacetic acid (NTA), ethylenediaminetetraacetic acid (EDTA) and equivalents thereof.

* * * * *